United States Patent
Halpern

(10) Patent No.: US 11,593,357 B2
(45) Date of Patent: Feb. 28, 2023

(54) DATABASES AND METHODS OF STORING, RETRIEVING, AND PROCESSING DATA

(71) Applicant: DataTempest, LLC, Cambridge, MA (US)

(72) Inventor: Kenneth Michael Halpern, Cambridge, MA (US)

(*) Notice: Subject to any disclaimer, the term of this patent is extended or adjusted under 35 U.S.C. 154(b) by 257 days.

(21) Appl. No.: 14/217,348

(22) Filed: Mar. 17, 2014

(65) Prior Publication Data

US 2014/0280162 A1   Sep. 18, 2014

Related U.S. Application Data

(60) Provisional application No. 61/802,002, filed on Mar. 15, 2013.

(51) Int. Cl.
*G06F 16/24* (2019.01)
*G06F 16/22* (2019.01)

(52) U.S. Cl.
CPC .............. *G06F 16/24* (2019.01); *G06F 16/22* (2019.01)

(58) Field of Classification Search
CPC ......... G06F 17/30312; G06F 17/30386; G06F 16/24; G06F 16/22
USPC ........................................................ 707/737
See application file for complete search history.

(56) References Cited

U.S. PATENT DOCUMENTS

| | | | |
|---|---|---|---|
| 5,263,160 A | 11/1993 | Porter et al. | |
| 5,794,005 A * | 8/1998 | Steinman | G06F 17/5009 703/17 |
| 7,487,241 B2 * | 2/2009 | Hines | H04L 41/0631 709/224 |
| 7,668,093 B1 | 2/2010 | Clubb et al. | |
| 7,788,195 B1 | 8/2010 | Subramanian et al. | |
| 8,271,996 B1 * | 9/2012 | Gould | G06F 9/542 719/312 |
| 2002/0010746 A1 * | 1/2002 | Jilk, Jr. | G06F 17/3089 709/206 |
| 2009/0006429 A1 | 1/2009 | Champion et al. | |
| 2010/0274990 A1 * | 10/2010 | Wilder | G06F 9/3001 712/22 |
| 2013/0144908 A1 * | 6/2013 | Geroulo | G06F 17/30286 707/776 |

OTHER PUBLICATIONS

International Search Report and Written Opinion for corresponding PCT Application No. PCT/US2014/30895, dated Aug. 27, 2014.
Declaration of Kenneth M. Halpern, executed Jul. 11, 2016, Boston, Massachusetts, pp. 3.

* cited by examiner

*Primary Examiner* — Shahid A Alam
(74) *Attorney, Agent, or Firm* — Orbit IP, LLP

(57) ABSTRACT

A non-transitory computer-readable medium having computer-readable instructions stored thereon which, when executed by a computer, cause the computer to perform a method of processing data comprising the steps of: receiving data associated with event instances; and for each of a plurality of iteration methods: partitioning the incoming event instances into logical data partitions; assigning an identifier to each event instance such that events classified in the same logical data partition receive the same identifier and a given event instance is always assigned the same identifier; and inserting each event instance into a doubly-linked list associated with the identifier in an appropriate location.

27 Claims, 11 Drawing Sheets

DATABASES AND METHODS OF STORING, RETRIEVING, AND PROCESSING DATA

RELATED APPLICATIONS

This application claims the benefit of U.S. Provisional Application No. 61/802,002 filed on Mar. 15, 2013, which is hereby incorporated by reference in its entirety.

FIELD

The present patent document relates to databases and methods of storing, retrieving, and processing data. More particularly, the present patent document relates to storing and processing serial data streams so that the data may be efficiently searched and retrieved.

BACKGROUND

There are many database programs in the world. There are relational databases, which are great at cross-referencing tables. There are various types of databases that search based on tags or keywords or Regular Expressions (regexps). There even are some programs that call themselves time-series databases. These generally require that the data be regular (evenly spaced in time) or artificially treat it as such. A few time-series products can handle irregular data (data occurring at random time intervals) but focus on its analysis rather than efficient storage and iteration over it. What does not exist is a specialized database that provides maximally efficient storage, retrieval, and scanning of stream data.

As a simple example, consider stock trades and quotes ("tick" data). Tick data from a live feed arrives irregularly. Once the data arrives, a database application must parse, clean and convert ("normalize") the data into a usable form. For many applications, it may be possible to predict the ways the stored tick data will need to be accessed and thus, the application may be optimized to access the data. For example, some applications may wish to iterate over all ticks in a given stock or just all trades in a given stock.

Certainly, queries by stock or by trades in a given stock can be performed in any of the aforementioned databases. However, such a query may be inordinately slow because of the way the data is stored and accessed. What is absent in the current art, is a database specialized for iteration over stream data in a set of pre-specified user-defined ways. With the emergence of high frequency trading, a database that can handle vast amounts of irregular stream data and efficiently iterate over that data may provide significant advantages. This is also true in myriad other areas where a variety of event types arrive in the form of irregular stream data, and either volumes are large or latencies are required to be low. Examples include intelligence, biotechnology, customer transaction management, system or security event logging, and email or message management.

SUMMARY OF THE EMBODIMENTS

In view of the foregoing, an object according to one aspect of the present patent document is to provide databases and methods of storing and retrieving data. Preferably the methods and apparatuses address, or at least ameliorate one or more of the problems described above. To this end, in one aspect of the embodiments disclosed herein, a non-transitory computer-readable medium having computer-readable instructions stored thereon is provided. When executed by a computer, the instructions cause the computer to perform a method of processing data comprising the steps of: receiving data associated with event instances; and for each of a plurality of iteration methods: partitioning the incoming event instances into logical data partitions; assigning an identifier to each event instance such that events classified in the same logical data partition receive the same identifier and a given event instance is always assigned the same identifier; and inserting each event instance into a doubly-linked list associated with the identifier in an appropriate location. Preferably, the non-transitory computer readable medium further comprises instructions that cause the computer to perform the step of assigning a reference to the last event instance in each partition of each iteration method.

Preferred embodiments of the method performed in response to the computer readable medium are very versatile. To this end, in some embodiments, new partitions in at least one iteration method may be dynamically added as needed during execution. In some such embodiments, the new data partitions from the iteration methods are dynamically accommodated. In yet other embodiments, the event instances may be different sizes and have different data compositions.

Many aspects of the method performed in response to the computer readable medium may be configurable. In some embodiments of the non-transitory computer readable medium, the data constituting an event instance is user defined. In some embodiments, at least one iteration method of the plurality of iteration methods is user defined. In other embodiments, the number of iteration methods is user defined.

In some embodiments, it may be advantageous to provide a means of linear ordering. Accordingly, some embodiments of non-transitory computer readable medium further comprises instructions that cause the computer to perform the step of associating a sequence value with each event instance wherein a given event instance is always assigned the same sequence value.

In a preferred embodiment, the non-transitory computer readable medium further comprises instructions that cause the computer to perform the step of associating a Container with a plurality of event instances. Some embodiments that include instructions for associating a container may further comprise a find algorithm that uses the container and the doubly linked lists assigned to partitions to locate an event instance subject to a specific set of conditions in a minimal number of steps.

Preferred embodiments of the method performed in response to the computer readable medium are also efficient. Accordingly, in some embodiments, the event instance is stored in non-volatile memory in only a single location In yet other embodiments, the non-transitory computer readable medium has computer-readable instructions that further cause the computer to perform at least one iteration method of the plurality of iteration methods in such a manner as to assign all event instances to a single logical data partition of that iteration method, corresponding to a single doubly linked list over all of the event instances.

In preferred embodiments, when executed the non-transitory computer readable medium further comprises the step of dividing each doubly-linked list into a set of slices wherein each slice in the set of slices refers to an individual entry in the doubly-linked list. In some embodiments that include slices, the slices occur at a regular sequence value interval. In some embodiments with slices, new slices occur after a designated number of event instances have been received.

In still other embodiments, the method performed in response to the non-transitory computer readable medium comprises the step of creating an index designed to store, for each doubly-linked list, sequence values associated with each slice and references to the individual entries. In some embodiments that include an index, the index further includes for each doubly linked list: 1.) a reference to a first entry; 2.) a reference to a last entry; and 3) the number of linked entries.

The methods performed in response to the computer readable medium described herein may be used to parse and/or handle any kind of data. However in a preferred embodiment, the data constituting an event instance is parsed from a serial data stream.

In another aspect of the embodiments of the present patent document, a database is provided. A preferred embodiment of a database comprises: a plurality of data structures stored in non-volatile memory, wherein each data structure contains data representing an event instance; a plurality of event wrappers stored in non-volatile memory, wherein each event wrapper is associated with a single event instance; and wherein each event wrapper comprises a sequence value and a plurality of partition ID's wherein each partition ID represents a logical data partition of an iteration method and wherein an event wrapper contains, for each iteration method, a reference to the previous and next event wrapper with the same partition ID. In some embodiments, the sequence value establishes the sequential order of any single event instance.

In preferred embodiments, the event wrapper further comprises the information necessary to decode and deserialize the associated event instance. In some embodiments, the information necessary to decode and deserialize the associated event instance includes an event type ID and an encoder ID. Preferably, the data representing each event instance is only stored once in the non-volatile memory. In embodiments including event wrappers, preferably each event wrapper is stored only once in the non-volatile memory.

In preferred embodiments, each partition ID represents a logical data partition of an iteration method, where each iteration method assigns each event instance to one of that iteration methods logical data partitions.

In another aspect of the embodiments of the present patent document, a flow manager is provided. In some embodiments the flow manager implements a method of controlling the flow of data that comprises the steps of: defining a plurality of modules each designed to receive a stream of data, wherein each module is designed to manipulate the incoming data; creating a plurality of messages wherein each message references a block of data that is not included in the message; defining a memory management system that manages storage of the blocks of data in memory; defining a plurality of queues wherein each module has at least one input queue and each input queue is designed to reference and prioritize messages from the plurality of messages; and providing a configuration element to dynamically configure at runtime both the topology and configuration of the modules and queues.

In preferred embodiments of the flow manager, the method may further comprise the step of exporting both global state information and state information associated with each module and queue in real time.

The configuration element may be implemented in numerous different ways. In a preferred embodiment, the configuration element is a GUI. In other embodiments, the configuration element is a command line interface. Other implementations may be used in other embodiments. In embodiments where the configuration element is a GUI, both global state information and state information associated with each module and queue may be displayed on the GUI.

In some embodiments, a separate thread is spawned for each module. In other embodiments, processor use may be managed in other ways.

In a preferred embodiment, the modules are run as a server and the configuration element is run as a client. In some embodiments where the configuration element runs as a client, the configuration element provides the ability to monitor and manage the modules and queues.

In yet other preferred embodiments, at least one module receives a stream of data from a data source, and at least one module normalizes the data into discrete event instances, and at least one module sends the event instances to a database.

In yet another aspect of the embodiments of the present patent document, a method of locating entries in a database is provided. In some embodiments, the method of locating entries comprises the steps of: receiving a set of criteria describing a desired event instance; locating a reference in a container that references an event wrapper; and iterating from the event wrapper to another event wrapper, which is associated with the desired event instance, using at least one of a plurality of iteration methods.

Some embodiments of the method further comprise the step of calculating a desired sequence value, and a desired partition ID of an iteration method, associated with the set of criteria. In some embodiments that calculate a desired partition ID, the desired partition ID is used to determine which doubly-linked list to use from a plurality of doubly-linked lists referenced by the container. In some embodiments that calculate a desired sequence value, the desired sequence value is used to locate the reference in the doubly-linked list.

In some embodiments, the desired event instance is located by iterating to another reference with a sequence value that is closest to the desired sequence value. In some embodiments, the iteration occurs using exclusively information precomputed and stored with each event wrapper. In some embodiments with precomputed information, the precomputed information includes a sequence value and partition ID for each iteration method. Preferably, the iteration step is performed without deserializing the event instance.

In still another aspect of the present patent document, a non-transitory computer readable medium is provided for carrying out the method of locating entries in a database described above. In some embodiments, the non-transitory computer-readable medium has computer-readable instructions stored thereon, which, when executed by a computer, cause the computer to perform the method of locating an entry in a database comprising the steps described above.

In still another aspect of the present patent document, a system for normalizing, storing and retrieving data is provided. The system includes at least one central processing unit (CPU), and both non-volatile and volatile memory in data communication with the CPU. In some embodiments, the memory includes a database as described herein. The database may reside in non-volatile memory. When the system is in operation, the database may reside in volatile memory or both non-volatile and volatile memory. In other embodiments, the memory includes a flow manager as described herein. The flow manager typically resides entirely in volatile memory. In a preferred embodiment of the system, the CPU may support multi-threading. In an even more preferred embodiment, the CPU may use distributive processing across a plurality of CPU's. The embodiments of the system may be used to perform or carry out any of the methods described herein.

As described more fully below, the apparatus and methods of the embodiments described herein may be embodied in numerous other forms. Further aspects, objects, desirable features, and advantages of the apparatus and methods disclosed herein will be better understood from the detailed description and drawings that follow in which various embodiments are illustrated by way of example. It is to be expressly understood, however, that the drawings are for the purpose of illustration only and are not intended as a definition of the limits of the claimed invention.

DETAILED DESCRIPTION OF THE EMBODIMENTS

Figure 1:
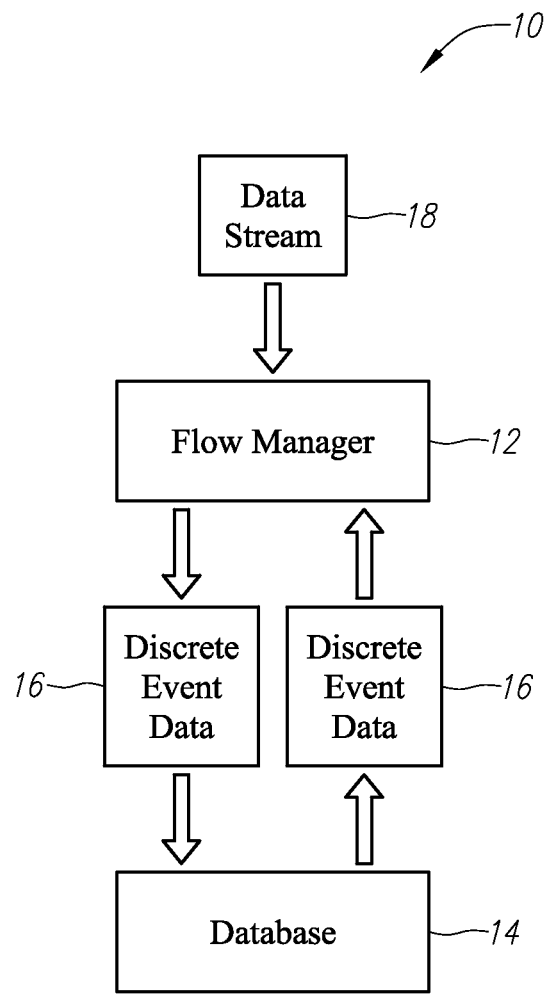
FIG. 1 illustrates an embodiment of a system for storing and iterating over a serial data stream.

In one aspect of the present patent document, a highly configurable system for the end-to-end management of "stream" data is disclosed. In a preferred embodiment, the system is optimized for speed and robustness, and may be of especial use where high volumes and/or low latencies are of particular concern. In a preferred embodiment, the system provides a convenient and efficient means of handling stream data of any shape and size. In a preferred embodiment, the system is also adept at handling stream data that arrives at irregular intervals.

Representative examples utilizing many of the features and teachings herein, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable non-volatile storage medium, such as, but not limited to, any type of disk, including floppy disks, optical disks, CD-ROMs, and magnetic-optical disks, read-only memories (ROMs), EPROMs, EEPROMs, magnetic or optical cards, flash memory or any type of media suitable for storing electronic instructions, and each coupled to a computer system bus. Portions of the program may also be actively residing in volatile memory, such as, but not limited to, Random Access Memory (RAM), DDR, SIMM, DIMM and any other configuration of RAM. The terms computer readable non-volatile storage medium, non-volatile memory, and on-disk as used in the present patent document are interchangeable.

In some embodiments, the computer program may be executed by a central processing unit CPU. In various embodiments, the CPU may be any number of chips including a Field Programmable Gate Array (FPGA), microprocessor, ASIC, Digital Signal Processor (DSP), PowerPC, Graphics Processing Unit (GPU), Complex Instruction Set Computer (CISC), Reduced Instruction Set Computer (RISC), or any other Processor or processing chip.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. While C++ is used to construct preferred embodiments, it will be appreciated that a variety of programming languages may be used to implement the teachings of the inventions as described herein including but not limited to C, Java, Fortran, other compiled languages, scripting languages, or any other type of language or combination thereof.

Moreover, the various features of the representative examples and the dependent claims may be combined in ways that are not specifically and explicitly enumerated in order to provide additional useful embodiments of the present teachings.

As described herein, a preferred embodiment includes particular data structures with particular elements in those data structures, however, in other embodiments, other data structures or elements may be included or omitted without departing from the scope of the embodiments disclosed herein.

As used in the present specification with respect to software, the terms "reference," "references," and "refers to" mean an object whose value refers directly to (or "points to") another value stored elsewhere in the computer memory using its address. In some embodiments, this may also be referred to as a "pointer." In many embodiments, the address in the computer memory is the starting location of a block of information. The address may point to either volatile memory or non-volatile memory/storage medium. When a distinction needs to be made, the current specification uses the term on-disk to refer to non-volatile memory/storage medium.

As used in the present specification with respect to the database, "entry" means a single item in a collection of items. For example, an Event Instance or an Event Wrapper or any other header or wrapper which refers to an underlying or associated Event Instance may be considered an "entry" in the database, in a doubly linked list, or any other collection of items.

Different embodiments may have varying levels of user configurability. As used herein, the term "user defined" means that one or more aspects may be specified by the user either prior to runtime or at runtime. "User defined" includes but is not limited to the use of parameters, configuration files, command line options, the ability to selectively use various different DLLs and any other method that allows a user to specify one or more aspects of the program.

FIG. 1 illustrates an embodiment of a system for storing and iterating over a serial data stream. In the embodiment shown in FIG. 1, the system 10 includes a Flow Manager 12 and a Database 14. The Flow Manager 12 receives data from one or more data streams 18. Although in a preferred embodiment the system 10 is adept at processing irregular serial data streams, the one or more data streams 18 may be any type of serial data stream including regular interval data streams.

As may be seen in FIG. 1, a preferred embodiment of the system 10 may be divided into two separate modules, the Flow Manager 12 and the Database 14. The Flow Manager 12 and the Database 14 provide different functions to the system 10 and although they are designed to work together in a system 10, they are both novel and patentable independently in their own right.

In a preferred embodiment, the interface between the Flow Manager 12 and Database 14 is one of both form and function. While the Flow Manager 12 is capable of handling raw data from one or more data streams 18, the Database 14 works with discrete event data 16. Accordingly, the Flow Manager 12 parses and sends discrete event data 16 to the Database 14, and receives discrete event data 16 from the Database 14. While in a preferred embodiment, the Flow Manager 12 and Database 14 are divided in this manner, in other embodiments, the division might be different or there may be no division at all. For example, in some embodiments, the Database 14 may be capable of handling one or more raw data streams 18 directly and no Flow Manager 12 is required. In another embodiment, the functionality of the Flow Manager 12, or a portion thereof, may be integrated directly into the Database 14. In yet another embodiment, the functionality of the Database 14, or a portion thereof, may be integrated directly into the Flow Manager 12.

In a preferred embodiment, the system 10 is designed to handle the following primary tasks: 1) Receipt and Storage of Raw Data, either live or replayed; 2) Normalization of Raw Data into Event Data; 3) Processing of Event Data, live or recorded, from any sources; 4) Storage of Event Data; 5) Filtering, analysis, use, and broadcasting of Event Data; 6) Iteration and Queries over Event Data; and 7) Simulation or Replay of a series of events. In other embodiments, other tasks may also be provided. In yet other embodiments, some of the 7 tasks listed may not be supported. As just one example, some embodiments may not provide simulation capabilities.

In a preferred embodiment, the Database 14 is designed to allow rapid traversal of a sequential set of data in certain ways pre-specified by the user. The Database 14 differs from traditional (ex. relational) databases in that it understands a concept of "time" and is designed to be efficient for operations most frequently of use in this context. At the core of the Database 14 is the concept of an "Iteration Method." An "Iteration Method" is a pre-specified linkage between events based on a user-defined partitioning function. This allows rapid traversal of events within a particular data partition under a particular Iteration Method—and more complex combinations of traversals where needed. Through a combination of a user defined "Iteration Methods" and the use of an index and possibly other assistive components, data associated with a given event can be located more efficiently than would otherwise be possible. Moreover, in a preferred embodiment, the database 14 is not constrained in size. The database 14 may exist across myriad devices and can be quickly traversed without explicitly deserializing and/or decoding each event along the way.

In a preferred embodiment, one key aspect to the Iteration Method is that it is user defined and therefore, may take into consideration how the data may be iterated over in the future. By allowing the "Iteration Method" to be user defined, the Database 14 may link and/or store the data in a way that makes iteration over the data later on, more efficient. This advantage is obtained without the user having to define and code all the repetitive functional aspects of the entire database.

Figure 2:
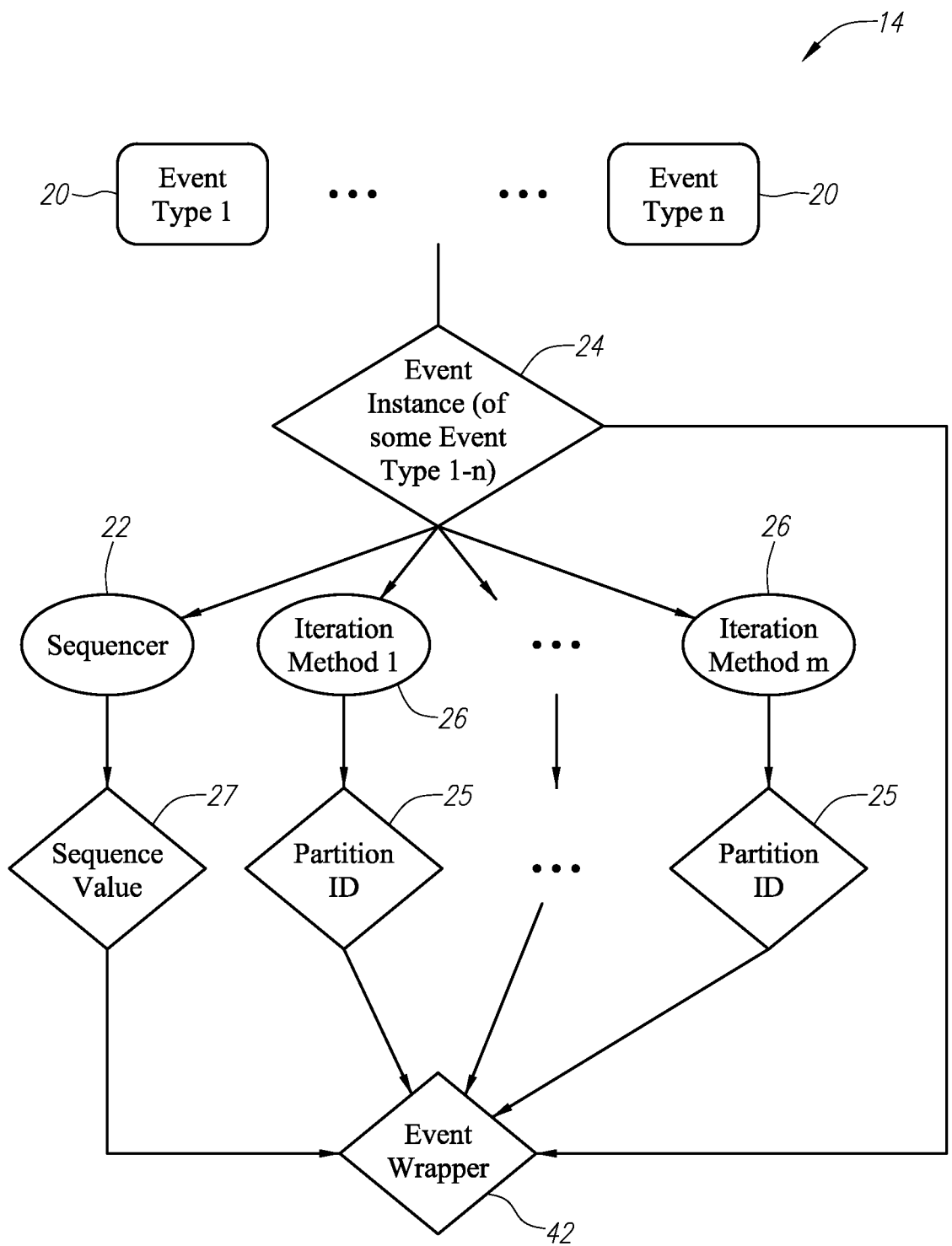
FIG. 2 illustrates the logical construct of an Event in a preferred embodiment of a Database.

FIG. 2 illustrates a logical construct of an Event in a preferred embodiment of a Database 14. The Database 14 may include between 1 and n (where n is any integer number) Event Types 20. In a preferred embodiment, an Event Type 20 is a class that corresponds to (at least) a unique, persistent (integer) Event Type ID and (string) Event Type Name. Accordingly, the Event Types 20 logically define what constitute Event Instances 24 i.e., an Event Instance 24 is an instance of a particular Event Type 20. An Event Instance 24 may also be referred to as a "User Event" herein.

In a preferred embodiment, an Event Type 20 is user defined. Allowing the user to define the Event Types 20 enables the user to control the discrete blocks of data the Database 14 understands. In a preferred embodiment, the Database 14 is abstracted from the raw data and only deals with Event Instances of the user defined Event Types 20.

In operation, the received raw data may be accumulated and/or parsed to see if it corresponds to any of the defined Event Types 20. If the raw data corresponds to one or more Event Types 20, it may be packaged into one or more data structures corresponding to one or more Event Instances 24 of the corresponding Event Types 20 and passed to the Database 14 as discrete event data 16. There is no limit to the number of Event Instances 24 that may be created based on the accumulated raw data. In one embodiment, multiple different Event Instances 24 may be spawned and they could (perhaps) be of different Event Types. For example, it is conceivable that raw data would accumulate until multiple Event Instances 24 of multiple Types 20 need to be spawned. In a preferred embodiment, each Event Instance 24 is associated with an Event Type ID to allow the Database 14 to easily understand which Event Type 20 the Event Instance 24 belongs to. Event Instances 24 are then processed, attached to the existing Database 14, and serialized into its storage location as appropriate.

In a preferred embodiment, an instance of an Event Type 20 is associated with an Event Instance ID, a unique ID associated with a given Event Instance 24. In a preferred embodiment, it serves as a convenience and is not integral to the operation of the Database 14. Accordingly, embodiments may exist without an Event Instance ID.

In a preferred embodiment, once an Event Instance 24 is spawned, a Sequencer 22 provides a Sequence Value 27. In a preferred embodiment, a single Sequencer 22 calculates a Sequence Value 27 for any Event Instance 24 of any Event Type 20. The Sequencer 22 must impose a non-strict linear ordering on the set of all possible Event Instances 24 of all Event Types 20. Accordingly, in a preferred embodiment, a single Sequencer 22 may be associated with all the Event Types 20. Although a single Sequencer 22 is preferred in most embodiments, there may be embodiments where the use of multiple Sequencers 22 to manage disjoint classes of data with different types of orderings but within a single Database entity may be employed. Similarly, in some embodiments the role of a Sequencer 22 may be filled by a Comparator (a user defined function which accepts any two Event Instances 24 of any two Event Types 20 and tells us whether the first comes before, after, or at the same point as the second in the ordering). In other embodiments, any other suitable mechanism may fill this role instead.

A Sequence Value 27 is a numerical representation that places an Event Instance 24 in some absolute sequence of values. The Sequence Value 27 is assigned to each Event Instance 24 by Sequencer 22. As just one example, the Sequence Value 27 may be in the form of a Date/Time value. In general, the Sequence Value 27 may be unrelated to time, but for illustrative purposes familiar terminology—such as "temporal", "before", "after", "later", and "earlier" may be used. The Sequence Value 27 defines a temporal relationship between Event Instances 24.

In a preferred embodiment, the Sequence Value 27 would have a sub-divisible representation, most likely codified as a floating point number. In other embodiments, the Sequence Value 27 may be a simple incremental counter. In a preferred embodiment, the set of Sequence Values 27 are non-strictly linearly ordered.

The Sequencer 22, or sequencer function(s), may also be user defined. In such a preferred embodiment, the Sequencer 22 may be a function that is passed an Event Type ID and Event Instance 24 and returns a Sequence Value 27. In various different embodiments, the Sequencer 22 may consist of a separate specialized function per Event Type 20, a single function independent of Event Type 20 or any other suitable mechanism.

As previously discussed, at the core of the database 14 is the Iteration Method 26. In a preferred embodiment, each Iteration Method 26 is called and passed every Event Instance 24. There may be between 1 and m (where m is any positive integer) number of Iterations Methods 26 present. Each Iteration Method 26 partitions the Event Instances 24 (across all Event Types 20) into a finite set of Logical Data Partitions. In a preferred embodiment, an Iteration Method 26 is not associated with a particular Event Type 20 per se. However, any Iteration Method 26 may use the Event Type ID to partition the Event Instances 24 based on Event Type 20 (possibly among other criteria).

An Iteration Method 26 partitions the incoming data into Logical Data Partitions. In a preferred embodiment, each Iteration Method 26 assigns each Event Instance 24 to one, and only one, of that Iteration Method's possible Logical Data Partitions. Accordingly, an Iteration Method 26 is a means of partitioning the set of all possible Event Instances 24 (of all Event Types 20) into a disjoint set of Logical Data Partitions unrelated across Iteration Methods 26.

In a preferred embodiment, an Iteration Method 26 consists of a functional method (or methods) for assigning a specific Partition ID 25 to each Event Instance 24. Each Partition ID 25 associated with an Event Instance 24 defines a Logical Data Partition the Event Instance 24 belongs to. In a preferred embodiment, each Event Instance 24 will belong to multiple Logical Data Partitions (one per iteration method) and thus, be associated with multiple Partition IDs 25.

Assigning Partition IDs 25 is just one method of associating an Event Instance 24 with a Logical Data Partition. In other embodiments, an Event Instance may be associated with a Logical Data Partition without using a Partition ID 25 or by other means in addition to using a Partition ID 25. As will be explained in more detail below, by pre-computing and assigning the Partition IDs 25 and Sequence Values 27, iteration over the Database 14 can be performed quickly and without expensively deserializing and/or decoding the underlying Event Instance 24 for each iteration.

In order to link Event Instances 24 belonging to the same Logical Data Partition together, in a preferred embodiment, each Logical Data Partition of each Iteration Method 26 includes a single doubly-linked list that links all the Event Instances 24 associated with that Logical Data Partition together. When the Iteration Method 26 assigns a Partition ID 25 to a particular Event Instance 24, that Event Instance 24 is appropriately appended to or inserted into the doubly-linked list associated with that Partition ID 25 under that Iteration Method 26. This occurs for each Iteration Method 26. If a doubly-linked list does not exist because the Event Instance 24 is the first to occur with a particular partition ID 25 under that Iteration Method 26, a doubly-linked list may be created. The doubly-linked lists allow the database 14 to quickly iterate over any Logical Data Partition of Event Instances 24. Because in a preferred embodiment the Logical Data Partitions may be user defined via the user defined Iteration Methods 26, with appropriate forethought, an extremely efficient database 14 may be easily created.

Once the Event Instance 24 has been assigned a Partition ID 25 by each Iteration Method 26 and a Sequence Value 27 by the Sequencer 22, all that information is stored in a single Event Wrapper 42 along with the Event Type ID, Event Instance ID (if present), and linkage information for each of the doubly-linked lists to which an Event Instance 24 belongs. Accordingly, each Event Instance 24, and its associated Event Wrapper 42, is saved to disk only once. However, that single Event Wrapper 42 associates the physical Event Instance 24 with a plurality of Logical Data Partitions.

Figure 3:
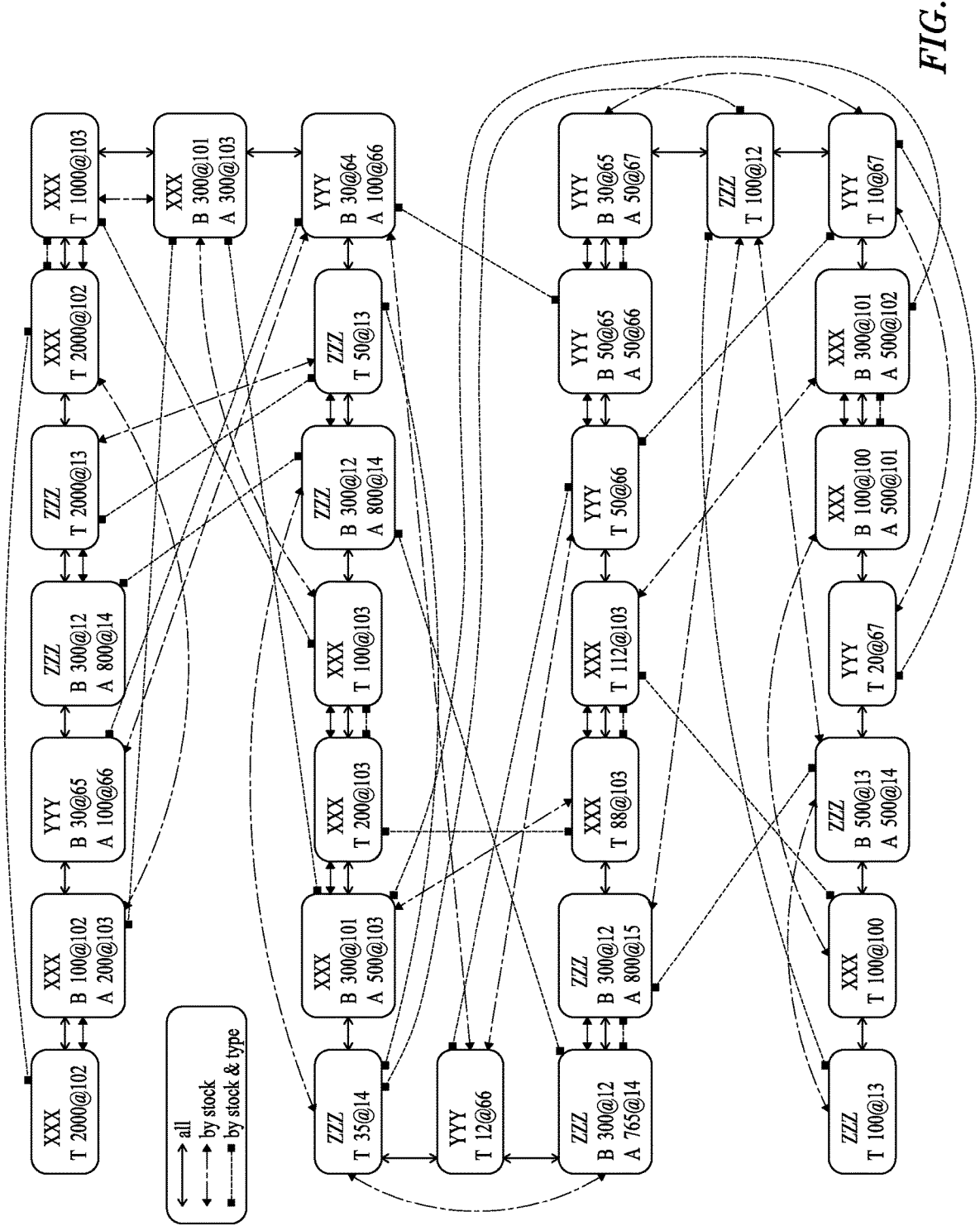
FIG. 3 illustrate the logical resulting linkage of one example in a preferred embodiment of a Database with the logical construct shown in FIG. 2.

In order to help understand a preferred embodiment of the Database 14, an example with respect to handling stock data is discussed. FIG. 3 illustrates one example of the logical connectivity of a plurality of Event Instances 24 that may result within a Database 14 for simulated stock data. FIG. 3 illustrates a sequence of stock trades and quotes (shown snaking their way across the figure) in three stocks: XXX, YYY, and ZZZ. Stock trades have the form "T size@price" and quotes have the form "B size@price" followed by "A size@price" to indicate bid and ask levels. Of course, in various different embodiments, other types of data other than stock data may be handled.

In the example shown in FIG. 3, there are two Event Types 20, called "StockTrade" and "StockQuote". The Event Type 20 "StockTrade" includes all stock data related to trades and the Event Type 20 "StockQuote" contains all stock data related to quotes. In a preferred embodiment, as raw data streams in, the Flow Manager 12 parses the raw data and determines whether any of the data conforms to a StockQuote or StockTrade. If any of the data conforms to the predefined Event Types 20, corresponding Event Instances 24 are created and sent to the Database 14. For example, "Trade for 1200 shares at 112.34 in xyz stock at 13:24:37.123 on 3/16/2012" would be an Event Instance 24 of the Event Type 20 "StockTrade."

Each of the Iteration Methods 26 (1 through m) will be passed the Event Instance 24. In this example, there are three iteration methods "all", "by_stock", "by_stock_and_type". Each Iteration Method 26 places the Event Instance 24 in exactly one Logical Data Partition and attaches the Event Instance 24 to a doubly-linked list associated with that particular Logical Data Partition under that Iteration Method 26. In a preferred embodiment, each Iteration Method 26 represents a method by which a user may want to iterate in the future. For example, the user in this case may want to iterate over all the StockTrades and StockQuotes for a given stock symbol, hence the "by_stock" iteration method.

If an Event Instance 24 is the first instance in a particular Logical Data Partition, the Logical Data Partition may be instantiated and the Event Instance 24 appended to the head of the doubly-linked list. In this way, Iteration Methods 26 may be said to learn and support a non-finite number of Logical Data Partitions. For the purposes of explanation, examples of Logical Data Partitions for the "by_stock" Iteration Method 26 would be separated by each company ticker symbol such that trades or quotes in "XXX" would be one Logical Data Partition while trades or quotes in "YYY" would be another Logical Data Partition of the "by_stock" Iteration Method 26. Each additional company ticker symbol would be allocated its own Logical Data Partition under the "by_stock" Iteration Method 26 and the user would not need to know apriori, the number of different stock symbols that exist. Moreover, the database would automatically adjust for a new stock ticker symbol. For example, as a result of an initial public offering (IPO).

In a preferred embodiment, each Event Instance 24 would also be passed to the "All" Iteration Method 24. Continuing with the example using trades in "XXX" and "YYY," the "All" Iteration Method 26 would place all the "XXX" and "YYY" Event Instances 24 in the same Logical Data Partition. In a preferred embodiment of the Database 14, there is an "All" Iteration Method 26, or an Iteration Method 26 containing a single Logical Data Partition with all possible Event Instances 24 (of all Event Types 20).

Finally, each Event Instance 24 would be passed to the "by_stock_and_type" Iteration Method 26. This Iteration Method would create a single doubly-linked list for each Event Type 20 for each stock. Because the example has two Event Types, "StockTrades" and "StockQuotes," two doubly-linked lists would be created for each stock ticker symbol, one for "StockTrades" and one for "StockQuotes."

As shown in FIG. 3, the three Iteration Methods 26: "all", "by_stock", and "by_stock_and_type" are each illustrated via a different dashed line. As is evident, even such a simple linkage may be complicated to visualize. Every Event Instance 24 (except the first or last in a given Logical Data Partition) is attached to two lines per Iteration Method 26. The three sets of lines behave differently. The solid line with thin arrow-heads corresponds to the "all" Iteration Method 26. This has a single Logical Data Partition containing all Event Instances 24. Therefore, each Event Instance 24 is attached to the prior and next Event Instance 24 in sequence. This is simple to visually illustrate and corresponds to an ordinary doubly-linked list of all events.

The dashed lines with a long dash followed by a short dash and with thick arrow-heads correspond to the "by_stock" Iteration Method 26. The "by_stock" Iteration Method 26 has three Logical Data Partitions: one for each of XXX, YYY and ZZZ. Each Event Instance 24 is attached to the prior and next for the same stock. This corresponds to three separate (and disjoint) doubly-linked lists of events.

The dashed lines with short dashes and with the square heads correspond to the "by_stock_and_type" Iteration Method 26. This has six partitions: Trades in XXX, Quotes in XXX, Trades in YYY, Quotes in YYY, Trades in ZZZ and Quotes in ZZZ. Each Event Instance 24 is attached to the prior and next of the same stock and type. This corresponds to six separate (and disjoint) doubly-linked lists of events.

Overall, there are 10 separate doubly-linked lists of events in the example shown in FIG. 3. The first partition includes all the events. The next three "by_stock" partitions together cover all the events. And, the last six "by_stock_and_type" partitions together cover all the events. Accordingly, each Iteration Method 26 independently covers all the possible events when its Logical Data Partitions are combined.

The example in FIG. 3 illustrates some of the benefits of the embodiments disclosed herein. Suppose a database user is currently reviewing the Trade in YYY in the middle of the data stream ("T 50@66") and wishes to perform one of two operations: 1) locate all the trades in YYY; or 2) locate the latest quote prior to the trade in question. In the first case, there are three other trades in YYY and a user may scan through them in three direct steps using the "by_stock_and_type" doubly-linked list. The second operation requires two steps using the "by_stock" doubly-linked list.

With a single ordinary doubly-linked list of just all the events, the first operation would require scanning over all the events, otherwise it is impossible to be sure when the first or last trade in YYY has been reached. Similarly, the second operation would require 12 steps.

As explained above, in a preferred embodiment, the Event Instance 24 is mapped to a Logical Data Partition by each Iteration Method 26, through the assignment of a Partition ID 25. A Partition ID 25 identifies a given Logical Data Partition under a given Iteration Method 26. When the Event Instance 24 is passed to the Iteration Method 26, the Iteration Method 26 evaluates the Event Instance 24 and assigns it a Partition ID 25 that represents the Logical Data Partition the Event Instance 24 belongs to. In embodiments using a Partition ID 25, the Partition IDs 25 need not form a consecutive sequence. Moreover, Partition IDs 25 under different Iteration Methods 26 are not related and may take on the same values. With this in mind, the "by_stock" Iteration Method 26 may create the Partition ID 25 by hashing the stock ticker symbol such that each ticker symbol creates a unique Partition ID 25. In other embodiments, other methods of producing the Partition ID 25 may be used as long as each Logical Data Partition within an Iteration Method 26 gets a unique, persistent Partition ID 25. Although an Iteration Method 26 may learn how to assign new partitions to newly encountered Event Instances 24, it may only do so in a way that maintains backward compatibility. An Iteration Method 26 must always assign the same Partition ID 25 to identical Event Instances 24.

Figure 4:
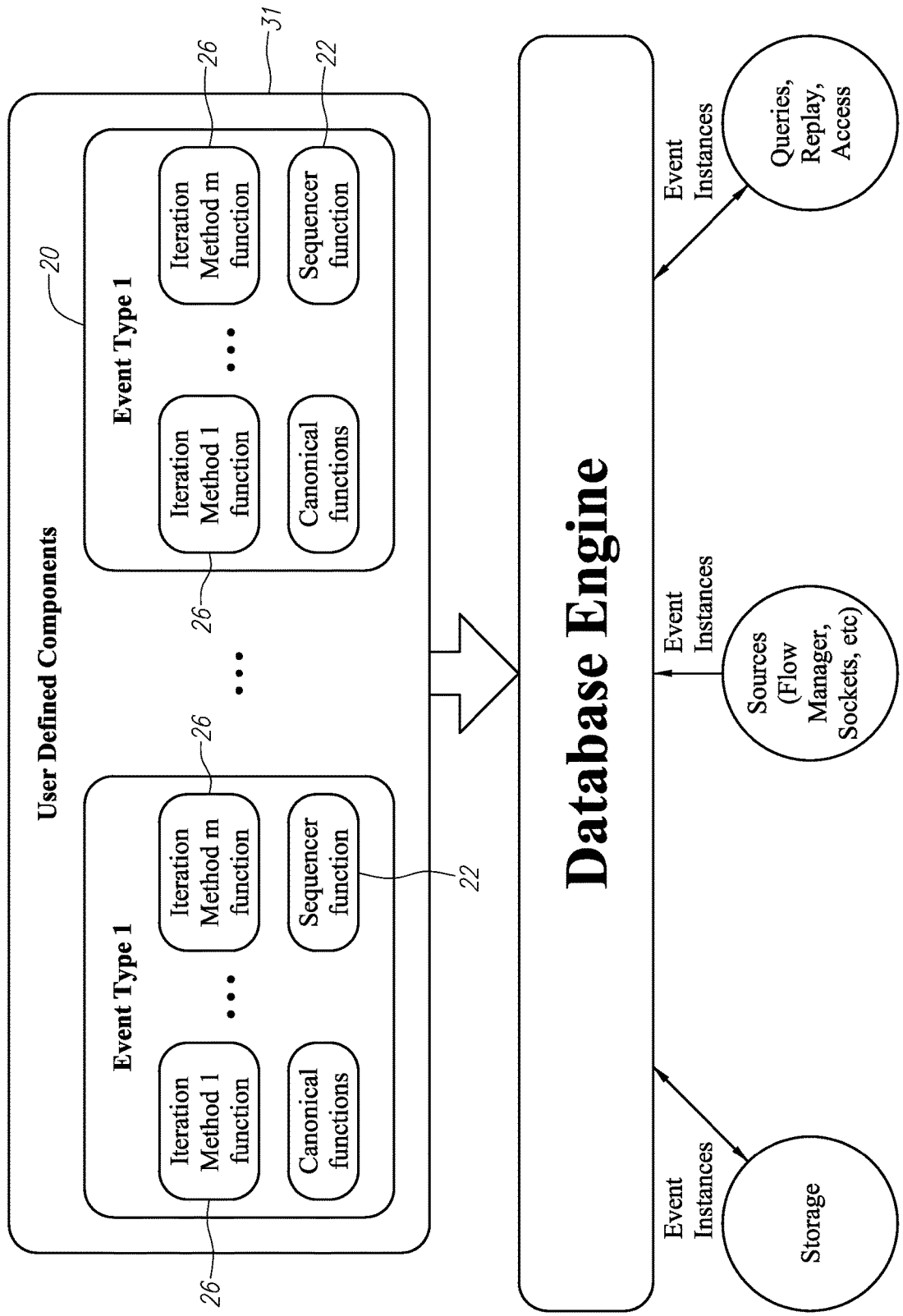
FIG. 4 illustrates a high level view of how user defined components are separated from the main Database in a preferred embodiment.

FIG. 4 illustrates a high level view of how an embodiment of a Database 14 may be constructed. As may be seen in FIG. 4, in a preferred embodiment, the Data Definitions 31 are separated out from the main Database Engine. By strategically selecting the Data Definitions 31 through user defined customization routines, the linkages between the Event Instances 24 may be configured by the user. The user defined linkages may be configured so that search and retrieval of information is as efficient as possible. Specifically, a judicious choice of Iteration Methods 26 may greatly facilitate the search and retrieval of information.

In a preferred embodiment, the Database 14 is constructed such that the Event Types 20, Iteration Methods 26, Sequencers 22 and related Canonical Functions 23 may be defined by a user and registered with the Database 14. In embodiments where these types of logical definitions are user definable, the Database 14 may be extremely flexible and may be able to handle lots of different kinds of data from different data sources. In addition, the logical definitions, which ultimately define how the data is linked and stored, may allow the user to link and store the data in a way that makes future iteration, search and retrieval extremely efficient. However, in some embodiments, many or all of these logical definitions may be hard coded into the Database 14 without departing from the scope of the embodiments described herein. More about defining and registering user defined portions of the Database 14 will be discussed later in this specification. Before discussing how a user may define any components, an understanding of how various different embodiments of the Database 14 store and retrieve data is beneficial.

In a preferred embodiment, the data structure of the Database 14 may be thought of as consisting of two major components: a "Twine" of linked Event Instances 24 and an Index that expedites the location of particular Event Instances 24 within the Twine. One can think of the Twine as consisting of the large number of doubly-linked lists—one for each Data Partition of each Iteration Method 26. In a preferred embodiment, each Event Instance 24 is a member of precisely one doubly-linked list per Iteration Method 26. FIG. 3 graphically illustrates the idea of what is meant by "Twine."

Depending on the embodiment, and the state of that particular embodiment, the data within the Database 14 may be located in-memory or on-disk. In a preferred embodiment, a copy of the entire Index resides in volatile memory regardless of where the data is located.

Preferred embodiments of the Databases 14 of the present patent document are constructed to store serial data in a simple efficient per-event manner while allowing complex logical linkages to be saved. In one such embodiment, each Event Instance 24 is stored only once with one associated Event Wrapper 42 and membership in the various doubly-linked lists is achieved through logical connectivity. Although the data is stored only once in a per-event manner, the Event Wrapper 42 may contain any number of complex logical linkages that allow the data to be searched using complex algorithms. In other embodiments, other logical data constructs that store data in a single location but allow complex logical linkages may be possible.

In a preferred embodiment, the Index contains location information—information that may be used to locate the Event Instance 24 in memory or on disk—for the first and last Event Instance 24 in each Logical Data Partition under each Iteration Method 26. In a preferred embodiment, the Index also includes location information for the latest Event Instance 24 prior to each of a set of specified Sequence Values known as Slices.

Although the term Index is used herein, an Index is just one implementation of a Container. A Container may be any data structure that contains references to a set of Event Instances 24 or Event Wrappers 42 such that given a set of criteria of a certain pre-specified type associated with that container, will identify an Event Instance 24 or Event Wrapper 42 most nearly satisfying those criteria. A Container and/or Index is an assistive aide in locating a specified Event Instance 24 or Event Wrapper 42. Containers may include but need not be limited to associative indices, hashes, binary trees, or combinations of these. A Container must be able to (1) incorporate a new Event Instance 24 or Event Wrapper 42 and (2) return a reference to an Event Instance 24 or Event Wrapper 42 in close proximity to that satisfying an appropriate set of criteria (defined by the Container).

Slices are created by a Slice Generator and correspond to the sequence values at which the index will provide information about the Database 14. In a preferred embodiment, slices are defined and used by the index in a manner independent of any Logical Data Partition or Iteration Method. In a preferred embodiment, a Slice Generator is a functional method that generates the next Slice given the last. This allows the Database 14 to expand the Index as new Event Instances 24 are added without anticipating all possible Slices apriori. For example, in one embodiment, given that the latest slice is t, a Slice Generator could return t+10 seconds. In other embodiments, the logic used by the Slice Generator to create a slice may be significantly more complex. In a preferred embodiment, the Slice Generator is user-definable.

In a preferred embodiment, the Index is an associative structure that sits in memory and allows the Database 14 to locate various Event Instances 24 within each doubly-linked list. In a preferred embodiment, the Index includes location information for the first and last Event Instance 24 in each Logical Data Partition and the latest Event Instance 24 prior to each Slice in each Active Partition of every Iteration Method 26. In a preferred embodiment, the Index also contains the number of Event Instances 24 in each Partition under every Iteration Method 26 and overall. While the latest Event Instance 24 before the Slice is used in the preferred embodiment, one skilled in the art will appreciate that any location relative to the Slice may be used, for example, the first Event Instance after the Slice may be used. In other embodiments, additional information associated with each Slice and each partition under each Iteration Method may be stored in the index as well.

Accordingly, the Database 14 may use the Index to quickly locate Event Instances 24. When doing a search or retrieval, the Index allows the Database 14 to get within a small number of steps of any Event Instance 24. Coupled with Iteration Methods 26, the Index makes the types of queries frequently associated with time-series quite efficient. For example, if the Slice Generator created 10-minutely slices, then the Index would return an entry for the latest trade in IBM prior to 13:30:00 on 3/16/2012, if a slice whose Sequence Value represents "13:30 on 3/16/2012" and a Partition ID corresponding to "trade in IBM" under the "by_stock_and_type" Iteration Method 26 was specified. Unlike the Event Instances 24 themselves, which can be directly scanned on disk, the Index must be brought into memory prior to use in a preferred embodiment.

In some embodiments, other components may be used to expedite lookups as well. The use of the additional components depends on the desired trade-off between lookup speed and disk usage. For example, in one embodiment, an on-disk associative structure could be used to locate any event directly. In other embodiments, various combinations of on-disk or in-memory structures could be used in a similar manner. In such embodiments, the "find" function intelligently chooses between the available means of locating a given Event Instance 24. In a preferred embodiment, the "find" function may select the most efficient means of locating a given Event Instance 24.

While in a preferred embodiment portions of the Database 14 exist both on-disk and in memory, the on-disk form is the "Database" referred to in most of this document. The size of an on-disk Database 14 can be very large and span many storage devices. As an example, one could store 100 billion events or more in an on-disk database. Though some in-memory data may be employed for caching or other purposes, a preferred embodiment minimizes the amount of deserialization that is necessary from the data stored on-disk.

One of the key design elements of the Database 14 is its separation of data and identity/linkage in different but associated data structures. Separating the data and identity/linkage in different but associated data structures allows iteration, in many cases, without the expense of accessing the data i.e. decoding and/or deserializing. For example, if the data associated with the Event Instance 24 is compressed or encrypted or expensive to deserialize into memory, then it may be undesirable to decode the data every time it is required to iterate—especially if millions or billions of iterations are required.

Returning to FIG. 2, in a preferred embodiment, Event Wrappers 42 are used to separate data and identity/linkage, and further reduce deserialization of the on-disk data during iteration. In a preferred embodiment, Event Wrappers 42 are more akin to iterators than to events. Depending on the type, each Event Wrappers 42 may be paired with event instance data or they may simply serve as in-place handles.

Figure 5:
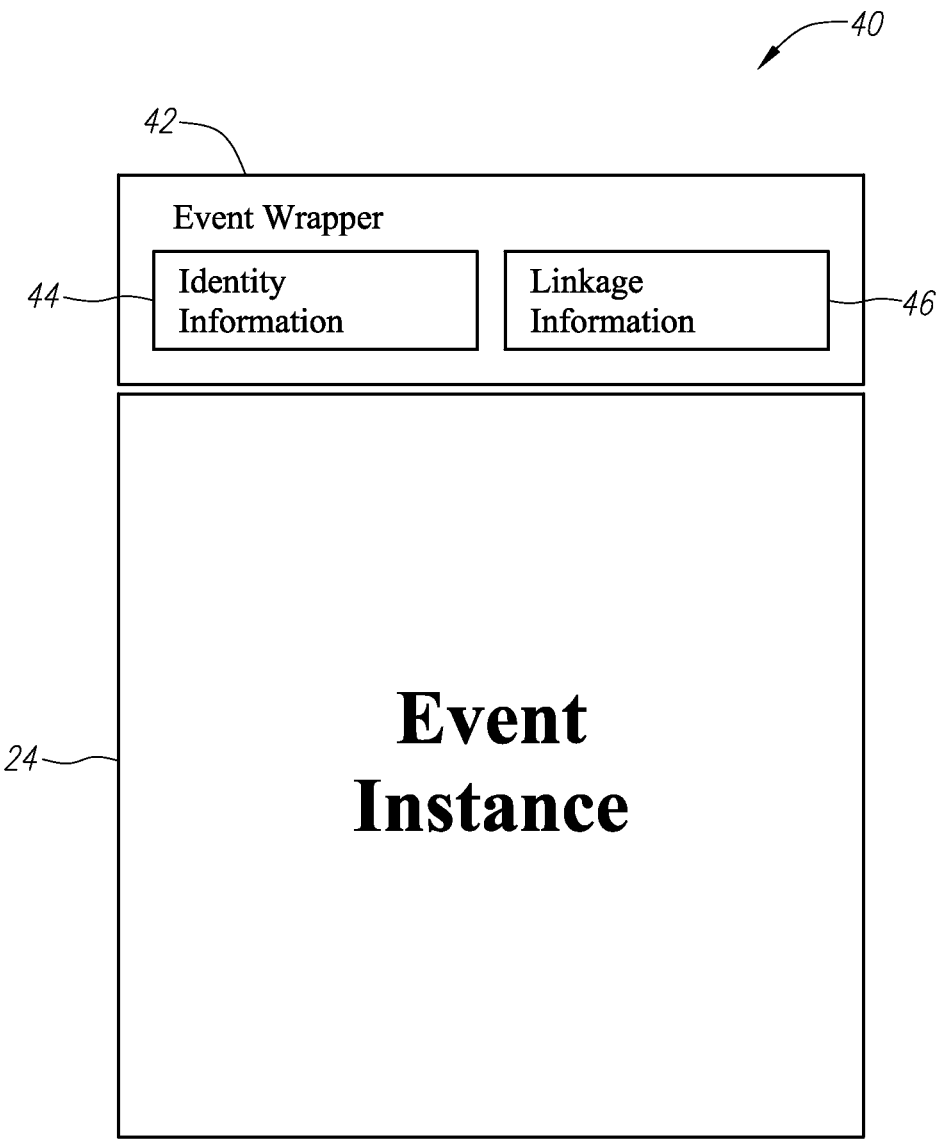
FIG. 5 illustrates the relationship of an Event Wrapper to its corresponding Event Instance in a preferred embodiment of a data structure.

FIG. 5 illustrates the relationship of an Event Wrapper 42 to its corresponding Event Instance 24 in a preferred embodiment of a data structure 40. An Event Wrapper 42 is a pre-computed block of information that is designed to allow the Database 14 to not have to decode and/or deserialize the full Event Instance 24 when iterating through the Database 14.

In a preferred embodiment, like the one shown in FIG. 5, the data structure 40 is divided into 3 parts: Identity information 44, Linkage information 46, and the Event Instance data 24. In other embodiments, other divisions of the event data are possible in accordance with the idea of separating data and identity/linkage. The term "Event Wrapper" may refer to both the in-memory or on-disk block of Identity Information 44, and Linkage information 46. Both in-memory Event Wrappers and on-disk Event Wrappers denote objects which reside in memory. The monikers on-disk and in-memory in this context refer to the underlying data. For an in-memory Event Wrapper, the associated Event Instance 24 generally lives in memory. For an on-disk Event Wrapper, the associated Event Instance 24 generally lives on disk. Each in-memory Event Wrapper points to an in-memory Event Instance 24 of the appropriate type. On the other hand, an on-disk Event Wrapper acts as an in-place iterator (more like traditional iterators) in that when a new Event Instance 24 is located, the Identity Information 44 and Linkage Information 46 replaces the old values (in memory). Unlike in-memory Event Wrappers which are in 1-1 correspondence with Event Instances 24 (and which allow us to locate a new Event Instance 24 by simply pointing to a new Event Wrapper), there typically is only one on-disk Event Wrapper and it moves (like a tape-head) between on-disk Event Instances 24. One advantage of using Event Wrappers 42 is that much of the expensive information is computed up front (at the time of addition of the Event Instance 24) rather than every time the Event Instance 24 is accessed. In a preferred embodiment, most iteration is performed with on-disk Event Wrappers 42 when the (on-disk) Database 14 is in use.

In a preferred embodiment, Identity Information 44 is a set of IDs and pre-computed data associated with an Event Instance 24. The Identity Information 44 may include the Event Type ID, the Event Instance ID, the Sequence Value (computed from the Event Instance 24 via the appropriate Sequencer Function 22), m Partition IDs (each computed from the Event Instance 24 via the appropriate Iteration Method 26 function), any choice of encoding, and the data size on disk. In a preferred embodiment, the Identity Information 44 is stored so that it remains associated with the Event Instance 24, or must be directly computed from the Event Instance 24. Identity Information 44 may be used to perform deserialization or lookup. Given the Identity Information 44, the Database 14 can perform many of the filtering or lookup functions that may be necessary without ever decoding the actual Event Instance data.

Generally speaking, the database is primarily stored on disk. However, depending on the current state of the database 14, some portion may be in volatile memory. Regardless, of whether the Event Instance 24 is loaded into memory or on-disk, Identity information 44, and Linkage information 46 are associated with each Event Instance 24 in a preferred embodiment. Because we already have defined the on-disk Event Wrapper as the iterator-like object (in memory), we will refer to the on-disk stored Identity information 44, and Linkage information 46 as the Serialized Event Wrapper. In a preferred embodiment, Linkage Information 46 is a set of links, pointers if the Event Wrapper 42 is in volatile memory and virtual file positions or offsets if the Event Wrapper 42 is on-disk, to the next and prior Event Wrapper 42 or Serialized Event Wrapper, in the same Logical Data Partition under each Iteration Method 26. In-memory Event Wrappers 42 and on-disk Serialized Event Wrappers have slightly different Linkage Information 46 but may be thought of as performing the same basic functions. If there are m Iteration Methods 26, there are at least m sets of links in each Event Wrapper 42 or Serialized Event Wrapper. Generally, Linkage Information 46 is present when Identity Information 44 is present, since it rarely makes sense to separate the two. Accordingly, in most embodiments, the distinction between Identity Information 44 and Linkage Information 46 may be one of concept more than implementation.

In a preferred embodiment, the in-memory Event Wrapper 42 is simply a superstructure that points to an underlying Event Instance 24 and, in addition to the Identity Information 44, has Linkage Information 46 that includes: 1.) A pointer to the Event Instance 24-unencoded and available for use; 2.) m Pseudo-pointers to either an in-memory Event Wrapper 42 or an on-disk virtual seek location for a Serialized Event-Wrapper to the next Event Instance 24; 3.) m Pseudo-pointers to either an in-memory Event Wrapper 42 or an on-disk virtual seek location for a Serialized Event-Wrapper to the previous Event Instance 24; and 4.) A virtual seek location for the corresponding on-disk Serialized Event Wrapper (if not a purely in-memory database).

Referring now to the on-disk Event Wrapper which is an iterator (and actually sits in memory but deals with on-disk events), in a preferred embodiment, the on-disk Event Wrapper 42 is not much larger than an in-memory Event Wrapper 42—and many can be created—but the mechanism of operation differs. In a preferred embodiment, the on-disk Event Wrapper 42 is not permanently attached to a specific Event Instance 24, but rather serves as a more traditional iterator or tape head. In a preferred embodiment, on-disk Event Wrappers 42 contain the following information in addition to the Identity Information 44: 1.) The size of the whole Event Wrapper structure on disk; 2.) m Virtual seek locations for the next Serialized Event-Wrapper with the same Partition ID under each Iteration Method 26; 3.) m Virtual seek locations for the previous Serialized Event-Wrapper with the same Partition ID under each Iteration Method 26; and 4.) The size on disk of the Event Instance 24 data (as encoded).

Referring back to FIG. 5, it may be seen that the block of data of the actual Event Instance 24 is stored separately. This data may be encoded or otherwise expensive to access or deserialize into an in-memory Event Instance 24. The Identity Information 44 and Linkage Information 46 allow the Database 14 to avoid doing so until absolutely necessary. In a preferred embodiment, a decode-on-demand approach to access is employed, caching decoded data for future reuse where possible. In other embodiments, other schemes for managing data may be used.

In a preferred embodiment, a single Virtual File (which is part of a Virtual File System VFS) is used to contain all such Serialized Event Wrappers as well as the serialized, encoded Event Instances 24. In embodiments with a single Virtual File, the file may be referred to as the Twine file. All seek locations (here and in the Index file) are virtual and refer to this Twine file. The Twine file handles translating the virtual seek location into the real on-disk location of the data.

In a preferred embodiment, an Index is provided in addition to the Twine File. The Index is a separate object that allows a lookup operation to start at a location within the Twine near the ultimate target, rather than at one end or the other. When looking up an intermediate Event Instance 24 along the Twine, the Index provides either an in-memory or on-disk location. In a preferred embodiment, the Index may be represented as an associative container plus some additional structure. While in various different embodiments, an Index may allow the Database 14 to skip to various places within the stored data. In a preferred embodiment, the Index allows the following to be directly looked up: 1.) The first Event Instance 24, the last Event Instance 24, and the number of Event Instances 24 in the Database 14; 2.) The first Event Instance 24, the last Event Instance 24, and the number of Event Instances 24 associated with any Logical Data Partition of any Iteration Method 26; 3.) The latest Event Instance 24 before any Slice in any Logical Data Partition of any Iteration Method 26; 4.) The Active Partition IDs currently associated with an Iteration Method 26; 5.) The set of known Slices and the sequence value associated with each such Slice.

In a preferred embodiment, the Database 14 may also be designed to not waste memory despite some of the logical guidelines outlined above. For example, if Event Instances 24 are sparse for a particular Logical Data Partition, a record for each Slice need not be included in the Index. If the Slice Generator is set to 10-minutely slices and there are only trades in xyz at 13:34 and 15:22, there is no need to include a record at 14:00. Accordingly, in such a preferred embodiment, the Database 14 only has records at 13:40 and 15:30 rather than needlessly including records that point to the first trade at 13:50, 14:00, etc.

Although in a preferred embodiment, the Index is designed to be held completely in memory during operation, the Index must be stored to disk to allow a clean shutdown and restart of the database. In some embodiments, the Index could be reconstructed from the on-disk data with each restart of the database but that would be extremely costly and undesirable. To this end, a preferred embodiment of the Database 14 includes an on-disk Index. The on-disk Index is represented as an unordered sequence of records. In a preferred embodiment, the in-memory and on-disk Index are not continually synchronized, as this would prove very temporally expensive. In a preferred embodiment, a point system is used to determine when to sync the Index to disk. In one embodiment, the point system is based on the number and type of modifications made. When the number of points exceeds a threshold, a certain time elapses, or the Database is exited, the entire Index is written to disk. In other embodiments, other criteria for when to sync the Index to disk may be used. In some embodiments, the Index may be continually synchronized to disk.

In some embodiments of an in-memory database, it may make sense to write everything to disk for future reuse. To this end, some embodiments of the Database 14 may include a primitive form of direct serialization of in-memory Event Instances 24 to disk for use when an on-disk Database 14 is not necessary or suitable (ex. scratch data or temporary subsets of the data for sandbox analysis). In that case, each Event Instance 24 may be stored as an Event Type ID, size, encoding method, and block of data i.e., it consists of the minimum information necessary to reconstruct the Database 14. This storage vehicle should not be confused with the actual on-disk Database 14.

Figure 6:
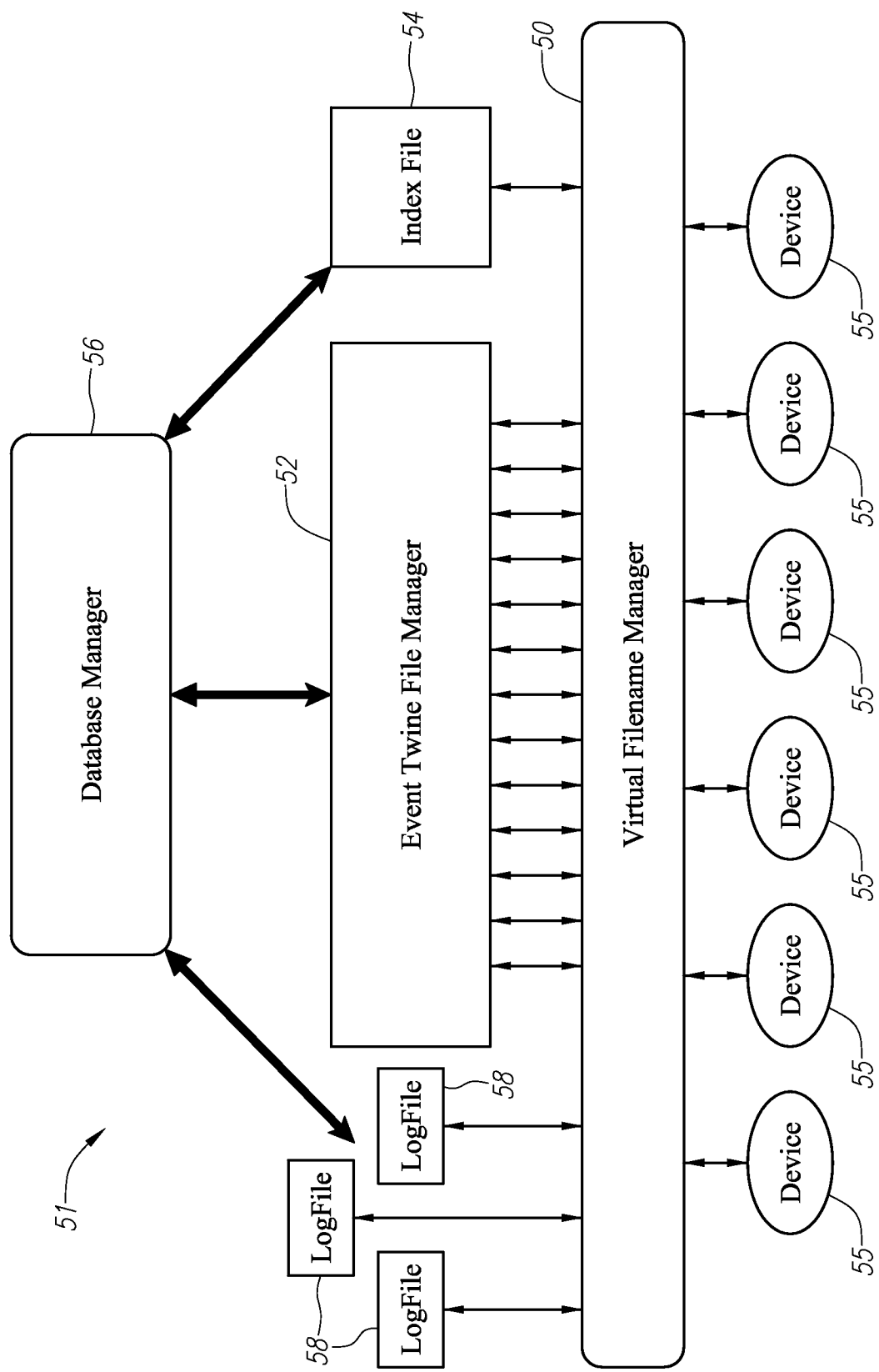
FIG. 6 illustrates one embodiment of a Virtual File System that may be used with a Database.

In various different embodiments, various different methods for saving data to disk may be used. In a preferred embodiment, the file system is designed to support large amounts of data and is therefore, capable of saving information across multiple files and multiple disks. Accordingly, in a preferred embodiment, a virtual file system (VFS) is used. FIG. 6 illustrates one embodiment of a Database virtual file system 51. In a preferred embodiment, the VFS serves the Database 14 files of a certain requested size, looks up real filenames from virtual filenames, and offers certain conveniences such as providing consecutive numbering of filenames given a prefix. In a preferred embodiment, like the one shown in FIG. 6, a VFS 50 may be used in conjunction with Twine 52 and an Index File 54. The VFS is used to abstract the naming of individual files as well as allow distribution of the Twine 52 across many real files—possibly on many different storage devices 55. In an embodiment that implements a VFS, almost all files used by the system 10 are managed through a VFS 50 layer. In a preferred embodiment, the VFS 50 maintains a list of storage devices 55 and provides a simple objective map between "virtual names" and real filenames on the various devices 55. The underlying file systems may be any known suitable file system including ext2, ext3 and ext4 used by Unix and Linux, HFS+ used by Mac OSX, any of the various file systems used by Windows such as NTFS, FAT or the like, or a networked file system such as NFS or AFS.

In a preferred embodiment, the Twine File 52 operates in conjunction with a VFS 50. In one such embodiment, the Twine File 52 consists of a set of subfiles. When the last subfile fills up, the Database 14 requests a new file of a certain size from the VFS 50, which then locates a storage device 55 with suitable space, sets up the file, and assigns it a virtual name.

The files in VFS may be named using any type of naming convention. In a preferred embodiment, a filename may be of the form "Foo.n" where Foo is the Twine File 52 prefix and n is the next unused integer number in the VFS 50. In some embodiments, the VFS 50 provides additional capabilities such as managing the use of prefixes with date and time stamps ("Foo.date.time" for example), such as for log files.

In essence, the VFS 50 is a collection of files. The VFS 50 deals with where the files are actually stored on disk and lets the Database 14 refer to them by virtual names. This also makes moving the files and backing them up easier. Along these lines, the Database 14 may be considered a larger collection of files containing everything needed to use and reconstruct the Database 14. This includes the Twine subfiles, the serialized Index 54, any log or error files 58, raw data files (if retention is desired), as well as any user configuration files and DLLs used to define the database.

The Twine File 52 is the stored form of the Event Instance 24 stream. Along with each Event Instance 24, it contains Identity Information 44 and Linkage Information 46 as discussed above. The Twine File 52 is a second virtual layer on top of the VFS 50. It allows the Database 14 to span many real files (on many storage devices 55). The Twine file allows the file system to appear as a single file to the Database 14, despite being composed of numerous actual files. In a preferred embodiment, the Twine File manager 52 opens all the existing subfiles on startup, loads their header info, and keeps them open. By leaving the files open, the Database 14 may access the files more quickly when it wants to retrieve data.

Although all the files may be open, in a preferred embodiment the VFS 50 has a single file in which it writes new entries. When space runs out, the VFS closes the current tail file to new additions (and updates its header) and requests a new file of some preset size from the VFS 50. The Twine File manager 52 then populates this as needed. The Index and Linkage all use virtual seek locations, which are positions within the virtual Twine File 52. Given a virtual seek location, the Twine File manager 52 determines the corresponding real file and a position within it.

One desirable feature of a preferred embodiment of the Database 14 is the ability to perform certain operations efficiently. In some embodiments, this efficiency may come at the expense of other operations. In a preferred embodiment, the VFS 50 may be set up with a similar purpose in mind. For example, in a preferred embodiment, an Event Instance 24 may be deleted by "nulling" it out (marking it bad) in the file, and requiring an occasional garbage-collection on demand to recover space. This allows large numbers of relatively quick operations, rather than requiring strict transactional atomicity. However, in a preferred embodiment, the Database 14 always ensures that recovery from interruption or failure is possible.

One advantage of this approach is that as long as events are added to the tail of the file, the subfile header does not need updating each time. If an unclean exit occurs, a simple integrity check of the last subfile is performed and the header is rebuilt—a relatively inexpensive operation.

In a preferred embodiment, each Event Twine subfile has the following header, followed by a sequence of Event Wrappers 42 as discussed above: 1.) Virtual seek position of first non-null (i.e. valid) event in file; 2.) Virtual seek position of first event in file (whether nulled or not); 3.) For a non-tail file, the number of bytes occupied by all events in the file (nulled and non-nulled). This only is nonzero once a file has been closed for additions (i.e. it isn't the active tail of the Twine). Note that in most cases, the header size plus this is the allocated size of the file; 4.) Number of bytes in deleted events; 5.) Number of bytes in events inserted out of order (for diagnostic purposes only); 6.) Number of iteration methods—included in each file for safety.

As discussed above in connection with FIG. 4, one of the desirable aspects of a preferred embodiment of the system 10 is the ability for the user to customize it. In a preferred embodiment, the system 10 is able to handle different types of serial stream data and allow efficient searches and iteration over Logical Data Partitions associated with different Iteration Methods 26 configurable by the user. In some embodiments, the user may define the Event Types, Iteration Methods, and Sequencer among other components. Accordingly, some of the preferred embodiments disclosed herein are just a specialized database backend designed as an application programmers interface (API). In an even more preferred embodiment, a variety of user-friendly interfaces created via scripting languages and graphical user interfaces (GUIs), may also be provided. These interfaces may allow the user to configure the Database 14 without directly writing code. Various design considerations of the critical components of a preferred embodiment are provided. In various different embodiments, more components may be defined by the user or fewer components may be defined by the user.

In a preferred embodiment, the user may specify a number of core components of the Database 14. In other embodiments, the user may not need to define any of the components and all the decisions may be hardcoded. In various different embodiments, there are a number of means to specify the requisite pieces. In some embodiments, a set of C++ classes and functions are provided by the user. These would be compiled into DLLs by the user, and the system 10 would dynamically load them at run time. In another embodiment, the user may directly specify core components as part of the general use of an API. Even a user with no need for the API may benefit from configuring the Database 14 in C++.

In yet other embodiments, a simple scripting language and GUI to simplify the process may be used to customize the database. The result may still be compiled, but the procedure requires far less technical expertise on behalf of the user. Regardless of the specification mechanism, the components discussed below may be used to define a Database 14 in a preferred embodiment.

In a preferred embodiment, the user must specify a set of Event Types 20. Once the Event Types are defined and the Database 14 has been put in use Event Types 20 can still be easily added. However, existing Event Types 20 may not be changed without reconstruction of the Database 14. In a preferred embodiment, each Event Type 20 should be of fixed size in memory to ensure a more efficient operation. However, variable-sized Event Types 20 may be used, though they may be costly to use in some embodiments. In a preferred embodiment, each Event Type 20 is registered as a set of functions that perform certain canonical operations such as creation of an Event Instance 24, its deletion, serialization, and so on. In some embodiments, the Database 14 may come with some simple canonical function defaults or templates that may be used when common conditions are met.

In a preferred embodiment, the user must also define a set of Iteration Methods 26. The Iteration Methods 26 are defined in such a way that, given any possible Event Instance 24, its Event Type 20, and a choice of Iteration Method 26, a Partition ID may be computed. Each Iteration Method may consist of one or more functions to accomplish this purpose. For a given Iteration Method 26, different functions may apply to different Event Types 20, or one may apply to many. For every Iteration Method 26 and every Event Type 20 some function must be registered. In a preferred embodiment, new Iteration Methods 26 may not be added without reconstruction of the Database 14—which may be time consuming for large data sets.

In a preferred embodiment, the user must also define a Sequencer 22. A Sequencer 22 is a function or set of functions such that, given any possible Event Instance 24 and its Event Type 20, a Sequence Value may be computed. In a preferred embodiment, one of the Sequencer functions 22 must be registered for each and every Event Type 20. If it makes sense to do so, the same Sequencer function 22 may be registered for multiple or all Event Types 20.

In some embodiments, the user may specify additional components. For example, in some embodiments, the user may define an encoder to encode the data. The Database 14 stores events on disk as a combination of the underlying Event Instances 24 and a set of precomputed data (Partition IDs, Sequence Value, Event Type ID, etc). The Event Instance 24 itself can be encoded in a user-defined way (ex. compressed or encrypted). This is accomplished through the use of Encoders. In some embodiments, basic encoder choices may be provided but in other embodiments the user may define and register their own if desired.

In some embodiments, the user may define a Randomizer to test the Database 14. In such an embodiment, the user may define a means of randomly generating and populating Event Instances 24 to test the Database 14.

In some embodiments, the user may define a Slice Generator. In embodiments that use a Slice Generator, it may be advantageous for the user to specify its operation. As new Event Instances 24 are added to the Database 14, it becomes necessary to append appropriate Slices to the Index. A Slice Generator fills this role, providing the Index with a "next" Slice given the last one. In some embodiments, simple intrinsic generators for fixed spacing (ex. every 10 seconds) or fixed density (which tries to balance the number of Event Instances 24 between slices) may be provided. However, in a preferred embodiment, the user may define their own if neither of these proves adequate.

Because of the complex associations of data in many embodiments, once the Database 14 is built and populated with data, changes may be difficult or impossible. For example, if the user changes the Event Types 20, Iteration Methods 26, Sequencers 22, or Encoders, the new specification may be incompatible with an existing Database 14. In a preferred embodiment, machinery or software may be provided to test backward-compatibility and upgrade the Database 14 appropriately when possible.

Given the potential cost of changes in many embodiments, the initial choice of design is very important. One important consideration is the choice of Event Types 20 and their class structures. These may be defined by the user, either directly as C++ classes or via a number of possible simplifying interfaces. Another important consideration is the choice of Iteration Methods 26. In many embodiments, this is the single most important design choice that must be made up front. Another consideration is the Sequencer 22, which determines how Event Instances 22 are ordered. For most embodiments, it will produce some sort of date/time representation.

In a preferred embodiment, each Event Type 20 corresponds to a C++ class, but the user need not explicitly write it as such. In some embodiments, an Event Type 20 may be defined by some other structure. In a preferred embodiment, a number of means may be provided to define the Event Type 20.

There are numerous ways a user can define different aspects of the Database 14. In some embodiments, a user may write the Event Type 20 class, define a Registration Function, compile it into a DLL, and instruct the Database 14 to load it. This approach offers the greatest flexibility. In other embodiments, a user may write a simple script listing a set of fields and their types for the class. The Database 14 may then code-generate the class and compile it. This approach potentially offers less flexibility than if the user wrote the class himself. However, the operational speed of the resulting Database 14 is similar. In some embodiments, the user may employ a GUI which allows him to choose fields and types. This is entirely equivalent to the aforementioned compilation script but is prettier and easier to use. Operational speed of the Database 14 is not harmed by the use of this GUI. In some embodiments, the user may write a simple script as for compilation but which is interpreted rather than compiled. This is convenient for conceptual testing when a compiler is not present, but dramatically reduces the operational speed of the database. In some embodiments, the user may employ a GUI which allows him to choose fields and types for interpreted processing. This is entirely equivalent to the aforementioned interpreted script but is prettier and easier to use. As with the interpreted script, the operational speed is dramatically reduced. In still yet other embodiments, any combinations of these methods of defining the Event Types 20 and other aspects of the Database 14 may be combined.

In a preferred embodiment, there are no hard constraints on the Event Type 20 classes. As long as the canonical functions have been registered and do their thing, it does not matter what the class looks like. The freedom to define the Event Type 20 classes with almost no limitations is a major advantage of the design of the preferred embodiments disclosed herein. In a preferred embodiment, the user is not required to derive the Event Types 20 from some special base class or impose onerous restrictions on the members or behavior of the class. Existing classes, even ones over which the user has little control, may be used.

While in a preferred embodiment, the user may define the Event Type 20 in various different ways, the class design may have a major impact on database performance. In a preferred embodiment, the true size in memory of an Event Type 20 almost always should be fixed and known at compile time. While in some embodiments, variable-sized Event Types 20 are allowed, they require great care and can significantly reduce performance. While the Event Type 20 classes may have any structure or relationship desired, if virtual functions are present then the convenient default registration functions found in a preferred embodiment will not be available to the user. Instead, the user will have to provide his/her own registration functions. The use of dynamic allocation, STL containers, or their ilk may surreptitiously make a class variable-sized. They should be avoided, unless that is what is desired.

One advantage of the embodiments of the Databases 14 disclosed herein is that the logical structure, which the database is constructed with, may be defined by the user. Accordingly, the logical way the data is associated, iterated over and retrieved may be defined by the user ahead of time. While traditional databases allow the user to decide how data will be grouped or associated within the database, embodiments of the Database 14 disclosed herein allow those groupings or associations to affect how the data is actually, stored, iterated over and retrieved. To this end, it is important for the user defining the components of an embodiment of a Database 14 to spend time determining the best logical structure for the Database 14 to make subsequent searching and use as efficient as possible. In constructing a Database 14 using the embodiments disclosed herein, a user should think ahead about how their choices affect the final Database 14.

One consideration is how finely to separate classes. For example, suppose you construct a Database 14 to track the behavior of computer system processes. Should a single "ProcessEvent" Event Type 20, which internally indicates whether a process has been spawned or terminated, be created or should two separate Event Types 20: "ProcessSpawned" and "ProcessTerminated" be created? In a preferred embodiment, how frequently a given criteria will be used to distinguish Event Instances 24 after construction of the Database 14 may be determinative of when a user should implement polymorphism over the criterion as a division into Event Types 20 rather than a switch within a given Event Type 20.

When making initial design decisions about the user definable aspects of the Database 14, the user should try to rely on precomputed values for the operations the user predicts will be most common. Filtering by such known or precomputed values, using them in Iteration Methods 26, or testing for them are trivial and require little overhead. On the other hand, decoding and deserializing data on the fly in order to implement some sort of in-class switching may be quite expensive. In preferred embodiments, the Event Type ID associated with an Event Instance 24 is a fixed number that is permanently associated with the Event Instance 24 and stored in the attendant Event Wrapper 42 and is therefore, extremely efficient to poll. Similarly, the Identity Information 44 (including Partition IDs under each Iteration Method and the Sequence Value) associated with an Event Instance 24 is precomputed and remains associated with the Event Instance 24 via the Event Wrapper 42.

In addition to trying to limit common operations to the use of precomputed values, another aspect a user should consider when defining the Database 14 is memory usage. Unlike adding Iteration Methods 26 to an existing Event Type 20, adding an Event Type 20 does not inherently add overhead. In a preferred embodiment, the number of Event Types 20 is only limited by the number of bits used to store the Event Type ID. As long as the number of Event Types 20 that are defined does not exceed the system limit, there will not be a problem. In contrast, adding additional Iteration Methods 26 increases the overhead for each Event Instance 24 because an additional Partition ID and associated Linkage Information 46 must be saved in each Event Wrapper.

Given that adding Event Types 20 does not add overhead but adding Iteration Methods 26 does, it may seem that the user should always favor adding more Event Types 20 when given the choice. However, the choice may not be that simple because if any Iteration Methods 26 use the "Event Type" itself as a criterion, then the number of Logical Data Partitions may scale with the number of Event Types 20. This would affect the size of the Index, which must entirely sit in memory.

In the embodiments disclosed herein, a user may evaluate the following four criterion to determine whether to split an Event Type 20 into two Event Types 20 or instead implement some sort of flag or switch within the Iteration Methods 26. If the criteria are met, then creating additional Event Types is probably preferred. Assuming that X is the original Event Type 20 and X1 . . . Xn the possible types into which the Event Type 20 would be divided, the first criterion is whether a user of the Database 14 will be much more likely to care whether an Event Instance 24 is of type X1, X2, etc than whether it is in the group (X1 . . . Xn) as a whole. Note that either (or both) can easily be codified into Iteration Methods 26 should it prove necessary. The second criterion to consider is whether the number (n−1) of new Event Types 20 that would be added is small (ideally a few, but certainly no more than a few dozen). The third criterion is whether the "Event Type" itself is not part of the Logical Data Partition criterion of any Iteration Methods 26—or if it is, whether the consequent Index scaling is acceptable. The fourth criterion is whether the proliferation of Event Types 20 will not obscure the intent of the Database 14 or the Database architecture.

In preferred embodiments, the memory use by the Database is designed to be fast and efficient. To this end, the use of variable size Event Types 20 is discouraged. However, in some embodiments, variable size Event Types 20 may be used and supported. Variable sized Event Types 20 engender Event Instances 24 whose true in-memory size is unknown at compile-time. These could include objects relying on dynamic memory allocation, which they must manage, or involving STL or other variable-size objects. Variable size Event Types 20 may be events that can change size at runtime but also could be events that are of fixed size once created but whose size is not known at compile-time (for example, char[n] with n determined at the time of creation). There are significant reasons to avoid such events including: 1.) Decoding of the data is slow because it involves inefficient memory allocation. 2.) Poorly designed classes may run into a host of problems that a preferred embodiment of the Database 14 normally protects against such as thread contention, memory leaks, etc.

Under the right circumstances a well-designed variable-size Event Type 20 class, which properly deals with the issues associated with variable size Event Instances 24, will not be problematic to use with a preferred embodiment of the Database 14. The first consideration is only a concern when frequent decoding is necessary. If few instances appear, or the Database 14 is used to primarily iterate and select, variable size Event Instances 24 are no more troublesome than any other kind. Moreover, they provide a flexibility that can be quite beneficial. One likely use is as a "catch-all" Event Type 20 for data that does not fit into other slots. For example, if the Database 14 is processing news stories and other similar information, it may define three Event Types with 256 byte, 1024 byte, and 4096 byte text fields. However, it may also wish to provide a variable-size Event Type for the rare "large" story without having to anticipate all possibilities.

When it comes to storage on disk, any Event Type 20 may create an Event Instance 24 of a variable-size. In fact, in a preferred embodiment, the stored size usually should be variable. In most preferred embodiments, fixed-size storage of the fixed-size Event Instances 24 would waste space. As an example, a 100-byte news story should not be stored in a 256 byte block on disk but rather should be stored as 100 bytes (plus a size). The Database 14 may conserve space on-disk if it intelligently serializes Event Instances 24, yielding a variable-size on disk. From the standpoint of database efficiency, the only concern is whether an Event Type 20 is of fixed or variable size in memory.

In a preferred embodiment, the user may also define the Sequencer 22. The choice of Sequence Value 27 for any given implementation of a Database 14 is typically a natural derivative of the problem at hand. In most cases, some sort of time-based value may be used, for example seconds past 1970. However, in various other embodiments, the Sequence Value 27 need not be based on time. The Sequence Value 27 may be anything that imposes a linear ordering on the set of all possible Event Instances 24. In a preferred embodiment, the standard C++ date-time classes may be used to help manage programming time related Sequencers 22.

When working with time-based Sequence Values 27, one important consideration is precision versus range. In a preferred embodiment, a Sequence Value 27 is an 8-byte floating point number, which admits a great deal of both. In other embodiments, other data sizes may be used for the Sequence Value 27; however, the precision versus range tradeoff will still remain. If a user wishes to minimize the space occupied by the date/time members of an Event Type 20 class, a 4-byte representation internally may be used instead. The following are some examples of 4-byte trade-offs: 1.) Second precision over around a century of dates; 2.) Microsecond precision over one hour; 3.) Minute precision over 8000 years. One thing to remember is that even in embodiments where an 8-byte representation is used, most present day system clocks give at best nanosecond precision. Anything better would arise from an external source or specialized hardware.

In a preferred embodiment, Iteration Methods 26 may also be defined by the user. Iteration Methods 26 may be more difficult (and important) to select up front than other components such as Event Types 20. The use of Iteration Methods 26 is one of the core features of the Database 14 that allows accelerated searching. Each Iteration Method 26 partitions the set of all possible Event Instances 24. In a preferred embodiment, moving from an Event Instance 24 to the next or previous Event Instance 24 in the same partition takes small constant time—even if they are very far apart in Sequence Value 27, or physical position.

In the embodiments of the Database 14 described herein, the choice of Iteration Methods 26 may be part of a trade-off. Each Iteration Method 26 increases the size of a stored Event Wrapper 42 (typically by about 24 bytes). The size of the Index depends in a complex way on the overall number of Logical Data Partitions across all Iteration Methods 26. For example, considering a Stock Data application, if there are 500 stocks and 5 Event Types 20, then the Iteration Method "By Stock" would have up to 500 active partitions (depending on how many stocks have been encountered so far), while "By Stock And Type" would have up to 2500. If these and "all" were the only Iteration Methods 26 then there would be up to 3001 overall partitions in the Index. In a preferred embodiment, the Index adds certain optimizations and will not quite be proportional in size to this unless a huge number of Event Instances 24 are represented in every partition. Nonetheless, in a preferred embodiment, it may be assumed that the Index scales linearly with the total number of Active Logical Data Partitions. Note that the total set of all Logical Data Partitions across all Iteration Methods 26 represents several redundant covers. Each Iteration Method's Partitions completely cover the set of Event Instances 24. Partition IDs are not related across Iteration Methods 26; the same Partition ID may be used with different Iteration Methods 26.

Each Iteration Method 26 must include a function to compute the appropriate Partition ID from any given Event Instance 24. In a preferred embodiment, this must be anticipatory and accommodate all possible Event Instances 24. In the case of "by stock" for example, the Partition ID could be a codification of the ticker symbol as an integer. To allow flexibility of encoding, an 8-byte representation for the Partition ID may be chosen instead of a 4-byte one. However, in different embodiments, different data sizes and types may be used for the Partition ID. The appropriate means of defining Iteration Methods 26 depends on the choice of approach to database specification, as described above.

In embodiments that allow a user to define certain aspects of the Database 14, there are various ways to allow the user to add those defined aspects to the Database 14. In order for the user defined functions to be used anywhere, they must be registered. This may be accomplished through calls to various registration machinery. These may be executed in different places depending on the embodiment. In one embodiment, a set of user-defined C++ Event Types 20, Iteration Methods 26, Sequencers 22, and other components may be imported into the database through the use of Dynamic Link Libraries (DLLs) and "Registration Functions." These Registration Functions really just serve as a place to put things that the user needs to be executed by the Database 14. The most important such "things" are the various registry function calls for the customized classes and functions. The names of the DLL files and Registration Functions are passed to the Database 14 when the Database 14 starts up. The Database 14 then loads and executes the user defined functions. Generally, the Database 14 need only be told the DLL and Registration Function names when first created. It then stores this information, along with the relevant DLLs themselves and all the configuration choices and other components needed to operate going forward.

In another embodiment, the user may define aspects of the Database 14 through a library and Application Programmers Interface (API). In such an embodiment, a library is provided with an API and a user may link directly with the library and explicitly call the various registry machinery (or anything else, for that matter) from his code. In that case, the use of explicit Registration Functions is entirely unnecessary.

In a preferred embodiment, each Registration Function may have the form: bool myregfn(Database *myapi, ParmTree *p). The "Database" class provides access to various registries for Event Types 20, Iteration Methods 26, the Sequencer 22, and any additional user-definable components, possibly including (but not limited) to Encoders, Randomizers and Slice Generators. The "ParmTree" class is described below and incorporates all relevant configuration information. The user may employ one or more such Registration Functions, each of which performs some or all of the necessary user-defined component registrations.

From these a user may then use the calls described below to register the necessary functions. A given Registration Function may contain calls to as many of the registry functions (or any others) as desired. Similarly, the overall registration may be split across multiple Registration Functions. In a preferred embodiment, it is a good practice to register all Event Types 20 prior to any Iteration Methods 26. Registration Functions also may be used to register optional components (Randomizers, Encoders, etc).

In embodiments that pass a "ParmTree" pointer, the pointer may refer to a "ParmTree" object that is a subtree of configuration parameters that may be forwarded to any user functionoids or other objects that are created in the Registration Functions.

In a preferred embodiment, the Database 14 is programmed to optionally allow a user to define their own functions through the use of functionoids. All of the registered user functions described below have as their last argument a "void *callarg." This allows the use of functionoids. In registering an Event Type 20, one of the pieces of information that may be passed is a pointer to an arbitrary object. When any of the Event Type 20, Sequencer 22 or Iteration Method 26 functions are called by the database machinery, that pointer is passed as the last argument.

In a preferred embodiment, a user may register an arbitrary set of functions that will be called on termination. These functions can serve to delete user-defined functionoids (or anything else). They are called before most other machinery is destructed and in the order they were registered.

Similar to embodiments that allow a user to define functions, a preferred embodiment allows the user to define a class structure. In order for a C++ class to be accessible via a DLL, a set of "control" functions must be provided and registered. In a preferred embodiment, the Database 14 may come with class templates the user may use, thus avoiding the need to write custom registration functions.

In embodiments where the user may define the Event Type 20, the Event Types 20 are classes over which there are preferably very few restrictions and injunctions. In a preferred embodiment, new Event Types 20 may be added in a backward-compatible manner. However, in most embodiments, existing Event Types 20 may not be changed without reconstructing the Database 14.

To allow the Database 14 to include an Event Type 20, the user registers a set of canonical functions which allow the Database 14 to create and destroy instances, copy them, etc. When registering an Event Type 20, the user may pass an argument "userarg" as an optional user argument to allow the use of functionoids. Each individual canonical function that has been registered may use or ignore the "userarg" as desired.

In a preferred embodiment, the following definitions are provided as part of the Event Type 20 specification. It should be understood that the following is just one example and that other embodiments may have more or less required definitions, or variations of the functions provided below, as part of the Event Type 20 specification. 1.) An Event Type ID: A unique 4 byte non-negative integer. These are assumed to be consecutive, though this is irrelevant for most purposes. However, it is best to avoid gaps in value if possible. 2.) An Event Type Name: For convenience, an Event Type 20 may be referred to either by ID or Name. The Name is a string and must be unique. 3.) A Single instance creation function: Allocates a single instance of the class and returns a pointer (or NULL on failure). In a preferred embodiment it has the form void* myfn(void *userarg). 4.) A Block creation function: Allocates a block of class instances and returns a pointer (or NULL on failure). In a preferred embodiment, it has the following form void* myfn(unsigned int num, void *userarg). In a preferred embodiment, the block creation function may assume that "num" is greater than zero. 5.) A Single instance deletion function: Deletes a single instance of the class. In a preferred embodiment, it has the following form void myfn(void *eventinstance, void *userarg). In a preferred embodiment, the single instance deletion function may assume that "eventinstance" is non-null and was created by the matching single-instance creation function. 6.) A Block Deletion Function: Deletes a block of class instances. In a preferred embodiment, it has the following form void myfn(void *eventinstanceblock, void *userarg). In a preferred embodiment, the Block Deletion Function may assume that "eventinstanceblock" is non-null and was created by the matching block creation function. 7.) A Copy function: Copies one class instance into another. In a preferred embodiment, the Copy Function has the following form void myfn(const void *srcuserevent, void *tgtuserevent, void *userarg). In a preferred embodiment, the Copy Function may assume that both "srcuserevent" and "tgtuserevent" are non-null and that each is of the correct type and size (if necessary). 8.) A Serialization Function: Serializes an Event Instance 24 to a block of memory in preparation for encoding or writing to disk. In a preferred embodiment, it has the following form int myfn(const void *srcuserevent, void *tgtblock, int tgtblocksize, void *userarg). In a preferred embodiment, the Serialization Function may assume that both "srcuserevent" and "tgtblock" are non-null and tgtblocksize is greater than zero. Also in a preferred embodiment, the Serialization Function should return the number of bytes written (or 0 on failure). It should fail if "tgtblocksize" is too small to hold the serialized Event Instance 24. 9.) Deserialization Function: Deserializes an Event Instance 24 from a block of memory (previously read and decoded). In a preferred embodiment, it has the following form, int myfn(const void *srcblock, void *tgtuserevent, int srcblocksize, void *userarg). In a preferred embodiment, the Deserialization Function may assume that both "srcblock" and "tgtuserevent" are non-null and srcblocksize is greater than zero. Also in a preferred embodiment, the Deserialization Function should return the number of bytes read (or 0 on failure). It should fail if "srcblock" does not hold a proper Event Instance 24 of the relevant type. 10.) Class Size in Memory Function: In almost all cases, this should return a simple constant, fixed at compile time. Although, as mentioned above, variable-sized classes are allowed in some embodiments, they can be very inefficient to work with and are not recommended. There are two ways to specify the class size: a) Fixed: A simple 4 bytes signed integer value is provided and the Class Size in Memory Function is left null. b) Variable or Fixed: A Class Size in Memory Function is provided to give the size of any given Event Instance. In a preferred embodiment, it has the following form int myfn (const void *userevent, void *userarg). In a preferred embodiment, the Class Size in Memory Function should return the size of the object in memory (including virtual functions and any dynamically allocated pieces, etc) or zero on failure. If the "userevent" argument is null, then the function should return zero if the Event Type 20 is of a variable size, and should return the fixed size known at compile time otherwise. 11.) A Class Size on Disk Function: This can be fixed or variable as with the Class Size in Memory Function and is used by the serialization and deserialization functions. It is not harmful for it to be variable, but will necessitate calls to a function and incur a cost (which depends on the efficiency of that function). Note that the size it specifies is independent of and prior to the application of any Encoders. Again, there are two ways to specify the size: a) Fixed: A simple value is provided and the Class Size on Disk Function is left null. b) Fixed or Variable: A Class Size on Disk function is provided to give us the size of any given Event Instance 24. In a preferred embodiment, it has the following form int myfn(const void *userevent, void *userarg). In a preferred embodiment, the Class Size on Disk Function should return the size of the object when serialized or zero on failure. This should be the precise value returned by the Serialization and Deserialization functions on success if handed the same "userevent." If the "userevent" argument is null then the function should return zero if the Event Type 20 is of variable size or the known fixed size otherwise. 12.) An optional pointer to a user-defined structure. This is passed to all registered functions as their last argument and allows the use of functionoids.

In embodiments that include an API, the API may provide a number of different Registry functions depending on the level of customization the user desires. For example, if the user wants to call the API to register a user class MYEVENT as an Event Type 20, the user may have a number of choices depending on the desired level of customization. In the first example, which allows the user to customize the control functions, "MYEVENT" is registered via an Event Manager API Class instance "EMAN" by calling EMAN.RegisterEventType( ) with an explicit set of ID info and control functions (and optionally one of the Sequencer 22 functions) as arguments. In another example where the user does not desire extensive customization the user may call EMAN.RegisterEventTypeAllDefaults<MYEVENT>( ) with a set of ID info. The control functions are generated as the obvious defaults. This works for Event Type classes with no dynamic allocation, no unusual canonical behavior, and no virtual functions. The user must specify whether to use the C++ copy constructor or a simple memcopy for the registered Copy function. One of the Sequencer 22 functions, and an argument pointer may optionally be specified as well. In cases where the user may want only a little customization, the user may call EMAN.RegisterEventTypeSomeDefaults<MYEVENT>( ) with a set of ID info and any subset of control functions. Missing control functions are set to the defaults. For the most part, the constraints are the same as those of EMAN.RegisterEventTypeAllDefaults<MYEVENT>( ). However, an explicit copy function must be registered. As may be seen, a preferred embodiment may provide various levels of customization via the API.

In a preferred embodiment, a Sequencer 22 may also be registered. Depending on the choice of Event Type 20 registration method, various options are available. For embodiments that use script or GUI definitions for Event Type 20, no separate registration of a Sequencer 22 may be necessary. If the user is compiling their own classes, then there may be a number of choices for how to register the Sequencer 22. Similar to the registration of an Event Type 20, registration of the Sequencer 22 may be performed via an Event Manager API Class instance EMAN. As described above, the relevant Sequencer 22 function may be registered as part of the Event Type 20 registration. In another embodiment, the Sequencer may be registered with a call to EMAN.RegisterSequencer( ), which sets the relevant Sequencer 22 function for a specific Event Type 20. This function may be used in embodiments where the user desires a different Sequencer 22 function for different Event Types 20. In embodiments where the user desires only a single Sequencer 22 function for all Event Types 20, a call to EMAN.RegisterSequenceForAllEvents( ) attaches a given Sequencer 22 function to all Event Types 20. In a preferred embodiment, the same individual Sequencer 22 function may be registered for multiple Event Types 20 without problem.

In a preferred embodiment, a Sequencer 22 function has the form SeqVal mysequencer(const void *userevent, void *userarg). In such an embodiment, the first argument is a pointer to the user event and the second is for use with a functionoid. The Sequencer 22 function may assume that the "userevent" is non-null. On failure it should return a specially defined Sequence Value "BadSeqVal." In a preferred embodiment, the presence of a Bad Sequence Value will invalidate an Event Instance 24 and prevent inclusion in the Database 14.

In a preferred embodiment, a function for each Iteration Method 26 and Event Type 20 must be defined and registered. Similar to the other functions described above, the user need not worry about separate registration if defining the database via a script or GUI. On the other hand, if compiling his/her own classes, a number of registration options are available.

In a preferred embodiment, each Iteration Method 26 has a unique 4-byte integer ID and string Name, similar to those of the Event Types 20. In embodiments that include integer IDs, it is very important that these IDs be consecutive. Some embodiments may reserve a special value for the omnipresent "all" Iteration Method ID (which is 0), as well as reserve a value denoting the "Bad Iteration Method ID." If there are n Iteration Methods 26, they must be numbered 0 . . . n−1. These values are permanent and in the typical embodiment, may not be altered without reconstructing the whole database. Nor may additional Iteration Methods be added without similar effort. If a new Event Type 20 is added, a function for each Iteration Method 26 must be associated with it. Each such function may already exist or may be newly constructed specifically for that Event Type. If an existing function is used, it may be modified to accommodate the new Event Type as long as it remains backward compatible.

In a preferred embodiment, any given Iteration Method 26 function has the following form: PartitionID myfn(const void *userevent, void *userarg). As elsewhere, the function may assume "userevent" is non-null, and can take an userarg for use with functionoids. The return value is an 8-byte signed integer. On failure a special "Bad" Partition ID value should be returned. Accordingly, in a preferred embodiment, the Iteration Method Function takes an Event Instance 24 of the relevant Event Type 20 and returns a Partition ID or the "Bad" Partition ID value.

In preferred embodiments, the Partition IDs need not be consecutive; in fact, 8 bytes may be provided to assist in hashing or encoding. In a preferred embodiment, the number of distinct IDs should not be huge, as that may encumber the Database 14. However, the individual values of the Partition IDs can be anything. Note that in a preferred embodiment, all possible Event Instances 24 must be dealt with by the supplied function(s). Moreover, the assigned values must be persistent. For this reason, state information is discouraged. For example, in the "by_stock" method of the stock data example mentioned earlier, one should not just assign the next available Partition ID to each newly encountered stock symbol; rather, an algorithmic method (such as a hash or encoding) should be employed. Backward compatibility must be maintained as new Partition IDs are added (when new Event Instances are processed). Partition IDs are not comparable across Iteration Methods 26, so they may be assigned for each Iteration Method 26 without regard to the others.

In a preferred embodiment, Iteration Methods 26 are registered via an Event Manager API Class instance, which is called "EMAN" for illustration. In a preferred embodiment, Iteration Method 26 functions must explicitly be registered for every Event Type 20. There is no shortcut as with the Sequencer 22 functions. The method to add them is "EMAN.RegisterIterator( )" This adds a specific Iteration Method 26 function (specified by ID) for a specific Event Type 20 (specified by ID). The same function may be registered for different Event Types 20 without issue. Each Iteration Method 26 relegates a given Event Instance to a particular function registered for that method and event type.

In addition to registering the appropriate function for each Event Type 20, a name may be assigned to each Iteration Method 26 in a preferred embodiment. This is accomplished (once per Iteration Method 26) via a call to "EMAN.SetNameForIterator( )."

In order for the Index to properly deal with new Event Instances 24, preferred embodiments of the Database 14 include a means for the Database 14 to decide when to add a Sequence Value Slice to its records. A general mechanism for adding a Sequence Value Slice may be provided via the use of a Slice Generator function. In a preferred embodiment of the Database 14, a plurality of Slice Generator choices is provided and the Database 14 allows the definition of additional ones as needed.

In a preferred embodiment, Slice Generators are defined as functionoids. In such an embodiment, each Slice Generator, whether user-defined or pre-included, is derived from an IndexSliceGenerator abstract base Class. Several virtual functions form the interface: next, config, accum, and a few functions for serialization. When an Index is operating, it requires a pointer to an IndexSliceGenerator. This may be changed at runtime, but one always must be associated with the Index in order for it to be able to create new Slices as needed. If using the API, the user may allocate (via singlet "new") an instance FOO of the desired Slice Generator and associate it with the Index. When the program shuts down, FOO is deleted by the Index class destructor. This is done via the registration machinery described below when using the Database program rather than the API.

In a preferred embodiment, a suitable subtree of the configuration options would be passed to the "FOO.config( )" function, which appropriately configures FOO as needed. If using the API, this can be done directly, or the user may skip this step and directly access the functionoid FOO itself if allowed. When running the Database, an appropriate subtree of configuration parameters is automatically passed to the config( ) function of the active Slice Generator. When an Event Instance 24 is passed to the Index for accumulation, several things happen: 1.) If the Index is empty, a Slice with the Event Instance's Sequence Value is spawned; 2.) The Event Instance is passed to "FOO.accum( )" to update any state info needed by the Slice Generator; and 3.) The "FOO.next( )" function is called and new Slices are spawned until past the Event Instance's Sequence Value. Note that configuration can be done directly if the user does not need access to the command-line parameters, or automatically via "config" if he does.

If the pre-included Slice Generators prove unsuitable for a given use, a user may define their own Slice Generator. In a preferred embodiment, this is accomplished by deriving from the provided IndexSliceGenerator abstract base class and defining the appropriate virtual member functions. When using the API, no registration is needed and the user-defined Slice Generator may be instantiated, configured, and associated with the Index (via an Index API function) in the same manner as a pre-included Slice Generator.

In a preferred embodiment, a user-defined Slice Generator may be registered for use with the Database 14 in a similar manner to other user-defined objects (such as Event Types 20). In this case, the user need only provide a single global creation function of the form "IndexSliceGenerator *MyCreationFunction(void) {return new MyIndexSliceGenerator;}". In a preferred embodiment, the registration of the user-defined Slice Generator would take place in a User Registration function (as with all other such objects) via a call to a Slice Generator Registration function. The Database 14 would then load and access the Slice Generator via the usual DLL machinery. Each such user-defined Slice Generator would be associated with a unique user-specified name via the Slice Generator Registration function as well, and this name would be used to spawn instances of the user-defined Slice Generator on demand.

In an Index in a preferred embodiment, not every Active Partition must have a record for every Slice. Redundant records need not be included. Sparsely spaced Event Instances 24 will not lead to wasted space in the Index. Nor will an overabundance of Slices, unless the density of Event Instances 24 matches it. This should be taken into consideration when designing a Slice Generator.

In some embodiments, a Fixed Interval Slice Generator is provided. A Fixed Interval Slice Generator is configured with a pre-set Sequence Value interval and generates each new slice at that spacing from the last one. For example, if the interval is 10 seconds, then the slices are 10 seconds apart. To use this Slice Generator, the user would either instantiate, configure it, and associate it with an Index if using the API or specify its use and interval value as configuration parameters for the Database.

In some embodiments, a Volume Based Slice Generator may be provided. A Volume Based Slice Generator attempts to balance the Index with roughly the same number of overall Event Instances 24 between Slices. The Volume Based Slice Generator may use an exponentially-weighted mean inter-event time to estimate the appropriate Slice Intervals going forward. In a preferred embodiment of a Volume-based Slice Generator, the arguments are the half-life of the exponential weighting decay for computing the average interval, the target number of events between successive slices, and a minimum interval between successive slices. To use a Volume-based Slice Generator, the user would either instantiate, configure it, and associate it with an Index if using the API or specify its use and arguments as configuration parameters for the Database 14.

In other embodiments, other provided Slice Generators may use other logical algorithms to determine when to create the next slice.

Not every Active Partition must have a record for every Slice. Redundant records need not be included. Sparsely spaced Event Instances 24 will not lead to wasted space in the Index. Nor will an overabundance of Slices, unless the density of Event Instances 24 matches it. In other embodiments, other logical algorithms may be used to determine when to create the next slice.

Flow Manager

Returning to FIG. 1, another aspect of the system 10 is the Flow Manager 12. The Flow Manager 12 allows users to design a set of plumbing through which one or more data streams 18 will flow. In a preferred embodiment, the Flow Manager 12 consists of a set of dynamically adjustable Modules and Queues that perform various tasks, manage the flow of data streams 18, and report statistics. In a preferred embodiment, users may monitor or change the live Flow using a provided GUI or their own tools developed with an API. Flows could include the acquisition and normalization of data, the processing of existing events, and the filtering and broadcasting of events, among other possible applications. In a preferred embodiment, almost all aspects of a Flow and its components are customizable by the user. Also in a preferred embodiment, these Flows may be created, destroyed, stopped and started all while the Flow Manager 12 is running.

In embodiments that include a Flow Manager 12, in order to perform any meaningful processing of stream data, some sort of "Flow" must be established. A Flow specifies the progress of data from one or more sources through a series of modules which may perform actions on or with it—such as filtration, processing, interpretation, accumulation of statistics or state, triggering program actions, broadcasting or writing to a destination, etc. A Flow may be "live", as in the case of real-time stock data or customer order information, or it may be "static" and operate on existing stored data.

Within the context of the Flow Manager 12, a given Flow may serve one or more purposes. In order to populate a Database 14, there must be at least one Flow for acquiring and normalizing raw data. "Normalization" is the process of interpreting the raw data. The data may be received from various sources in various formats. As some examples, sources could include files, ftp connections, sockets, or a database, among other possibilities. Via Normalization, Event Instances 24 may be generated from the raw data as appropriate. The resulting Event Instances 24 may then be fed into a Database 14 or further processed.

Another purpose for a Flow may be selection and filtering. In some embodiments, a user may wish to select or exclude Event Instances 24 based on various criteria. In some embodiments, for anything more complex than simple iteration within a Logical Data Partition, it may be required to scan through a portion (or all) of the Database 14. In a preferred embodiment, this may be accomplished via a Flow. The Event Instances 24 which are passed along may then be stored in a new database (perhaps a temporary in-memory one) or used as desired.

Another purpose for a Flow may be accumulation of statistics. In some embodiments, a user may wish to know statistics that have not been pre-computed by the Database 14. For example, if a user wishes to know anything more complex than the simple tallies provided by the Index, a Flow may be used to scan through the Database 14 and accumulate specific statistics.

Another purpose for a Flow may be cleaning or processing of data. Aside from filtering "bad" data, a user may also wish to clean or process data in various ways. In a preferred embodiment, this may be accomplished in a Flow. Depending on the implementation, cleaning and processing of data may be part of the initial acquisition/normalization Flow, or a separate Flow.

Yet another purpose for a Flow may be storage and dissemination. Other than directly using the Event Instances 24 that emerge from various points in the various Flows, it may be desirable to store them or broadcast them to client processes or computers. It may also be desirable to perform simulations by processing static data and broadcasting it as if it were live. This may also be accomplished by setting up a Flow.

In a preferred embodiment of the system 10, Flows are the primary means of reading raw data into the Database 14 and the primary means of broadcasting data from the Database 14 to clients or programs. Flows may also serve as a critical means of modifying and accessing the Database 14. In a preferred embodiment of the system 10, the user may define Flows, execute them, and dynamically adjust and monitor them through a variety of tools, including a Client GUI.

Formally, a Flow is a directed graph that represents the progress of data from one or more sources to one or more destinations. A Flow may be thought of as a dynamically adjustable set of plumbing for data. In a preferred embodiment, multiple flows may be defined and coexist (as configurations) but only one may be executed at a time (except if carefully arranged so as not to conflict with one another). That is, under almost any reasonable circumstances, only one flow touches upon any piece of data at a time. Thus, in a preferred embodiment, there are not two flows working on the same data at the same time. More generally, multiple flows may be configured to handle data the same way you would program multiple threads in any software application. Care needs to be taken to prevent multiple flows from ever accessing the same data at the same time. Accordingly, there is typically only one flow for a given data source on a given computer at a time.

In a preferred embodiment, a Flow has the mathematical structure of an acyclic directed graph consisting of nodes 82 and arrows 84. In a preferred embodiment, a Flow may be structurally implemented with two kinds of objects: Modules and Queues. These do not directly correspond to nodes 82 and arrows 84. Rather, a Module and its input Queues together correspond to a node 82 while the arrows 84 are not directly represented as objects and appear implicitly in the way that information is passed. In a preferred embodiment, a Module may have any number of input Queues, from a single input Queue to numerous input Queues.

In a preferred embodiment, all communication between Queues and Modules takes place via lightweight "Messages." In such embodiments, there may be two types of Messages. Control Messages tell Modules to do certain things (such as pause, start, stop, etc), while Data Messages refer to Event Instances 24 or other data.

A Queue combines a set of inputs (arrows) from other Modules into a single point of entry to its associated Module. A Module prioritizes the input Queues, selecting a message from amongst them based on some customizable criterion, does something with this message, and passes the result to the input Queues of one or more other Modules. In a preferred embodiment, the inputs to a given Queue are prioritized in order of receipt, and the merging process within the Module may prioritize some input Queues over others. In such an embodiment, the input Queues to a given Module may be assigned absolute positions (referenced by specific integers that have meaning to that Module) or simply by the order in which they were assigned to the Module (constituting a stack of input Queues, so to speak). The output Queues from a module (each an input Queue to another Module) may be assigned specific positions or not, depending on whether this is meaningful to the Module.

For example, in the case of a "Switch" Module with 3 outputs, the positions of the outputs (numbered 1, 2, and 3) would have meaning to the Module, and it would be up to the architect of the Flow in question to ensure that they are assigned in a manner consistent with this meaning. The Module would then route any given input message to one of these three outputs depending on the content of that message. On the other hand, some Modules may not assign meaning to specific choices of output Queue. They may simply transmit any messages they generate or pass along to all the outputs (or conceivably to one chosen randomly or by some other algorithm that treats them symmetrically).

In a preferred embodiment, Queues never modify data; they simply prioritize it. On the other hand, Modules may or may not modify data. In order to replicate Event Instances 24 or other data objects, a copy-on-need means may be provided. When a Module wants to modify an Event Instance 24 or other data object, a check may be performed to determine whether any Messages exist which refer to the Event Instance 24 or other data object. If so, a copy is made and handed to the Module to work with instead. Any other Messages continue to refer to the original Event Instance 24 or other data object.

A preferred embodiment includes a set of simple Modules and some abstract base classes for Module categories. To define a new Module, the user may derive from the appropriate abstract bases classes or from the abstract Module base class itself.

In a preferred embodiment, the Modules may include a number of general categories. For example, a Flow Module may be designed to be used with a data source. A Source Module attaches to a data source and generates tagged blocks of raw data for consumption by a Normalizer (or direct storage). The attached source may be a file, socket, ftp connection, or database. For example, a Source Module could be connected to a stock tick data feed via a socket connection. In such an embodiment, the Module would wait, receive a stream of byte-data, time-stamp it as suitable, and based on some criterion, clip off a block and pass it to a Normalizer.

Another category of Modules may correspond to a Normalizer. A Normalizer receives blocks of raw data from a Source Module and/or Event Instances 24 from any Module and generates new Event Instances 24 as needed. Normalizers are what make sense of the raw data. In the stock tick example, the raw data has some specialized format. The Normalizer would decode this. The Normalizer may wait for another block from the Source Module, if the current one is incomplete, or it may generate multiple Event Instances 24 (trades and quotes in the example) from a single block. Similarly, a Normalizer could receive and accumulate limit-book levels from another Normalizer until it is ready to spawn a new limit-book Event Instance 24.

As yet another example, a Flow Module could relate to an Accumulator. An Accumulator Module aggregates statistics from Event Instances 24. For example, it could track the cumulative volume for each stock and then issue a special "stock volume" Event Instance 24 every minute, or the Accumulator Module could simply export the stock volume for use by a client.

Another Module Type may be related to a switch. A Switch Module Sends the input to one (or more) of an indexed set of outputs based on the content of the Event Instance 24.

Some embodiments may include a Filter Module. A Filter Module passes or discards an Event Instance 24 based on its content. In a preferred embodiment, only the message is discarded; if other Modules refer to the Event Instance 24, it will persist.

Another type of module may be related to a processor function. A Processor Module modifies the contents of an Event Instance 24 and may or may not discard it. However, any changes that affect Identity Info 44 (i.e. Partition ID or Sequence Value) may lead to difficulties down the road. In most embodiments, whether the Identity Info 44 will be affected cannot be tested for because such information is specific to the user-defined Event Type. Because the Identity Info 44 is computed by (possibly expensive) user-defined functions of the user-defined Event Type 20, a processor Module may not easily be able to determine whether seemingly harmless changes to the Event Instance 24 would result in a change to it. Accordingly, care must be taken to avoid any such modification, and a processor Module generally should have intimate knowledge of the Event Instances 24 it is processing.

Another category of Module Type is one that relates to destination. A Destination Module specifies a target. A target may be a file, socket, ftp connection, database, or other location, thus the target may be referring to a transmission or a storage. Unlike the separation of Sources and Normalizers, in a preferred embodiment, any denormalization (or encoding) is performed in the Destination Module itself. Generally, it should be the responsibility of the recipient to figure out how to make use of the Event Instances 24.

Yet another type of Module may relate to a Trigger. A Trigger Module initiates some user-defined action when certain conditions are met.

All Module classes ultimately derive from a common base class. In a preferred embodiment, in order to define a Flow Module, the user must define a class. This class may be derived from the abstract base class for all Modules or from a class for any of the categories described above (or from any existing Module class as well).

As mentioned, in a preferred embodiment, every Module ultimately derives from a common Module base class. Specialization may be performed through a set of virtual functions. Aside from various maintenance and informational functions, there are two primary functions. The first primary specialization function is "select". This examines the set of input Queues and selects the next message to process (if there is one). As such, it constitutes the input prioritization function.

As an example, if a user wished to prioritize all inputs by order of receipt, they would use a single input Queue which takes all the inputs, and the select function would trivially read it. As another example, if a user wished to prioritize inputs in two buckets, high and low priority, they would have two input Queues, one for each bucket and taking inputs from the appropriate Modules, and the Module select function would take an input from the "high" Queue unless it is empty, in which case it would take one from the "low" Queue. As yet another example, if the user wished to prioritize input from Module A over input from Module B over input from Module C over all other inputs from other Modules, they would have 4 input Queues, one for each of Modules A, B, and C, and one catch-all for all other inputs. These would be ordered but not indexed. The Module select function would choose the first non-empty Queue in the ordering.

The second main Module specialization function is "execute". It operates on the message (possibly modifying it or spawning new messages along the way), updates its internal state and statistics, and outputs the message to any output Queues as well. This function also may do such things as poll sockets or other connections (in the case of Source Modules) or send output to disk or a Database or other destination (as in the case of Destination Modules). Note that any selection over outputs to other Modules is performed within the execute function.

Of the Module types discussed above, special note should be made of the behavior of Source Modules. These have no input Queues and simply wait on a socket or some other source of Event Instances 24, or other (raw) data. In this sense, their input is generated by the execute function rather than the select function.

As mentioned, in a preferred embodiment, communication within a Flow takes place through the use of Messages. Control Messages are specialized and signal a Module to do such things as Pause, Restart, or Terminate. They always are prioritized over Data Messages by the Module and sit in a separate structure within it. Data Messages are passed via the Queues discussed earlier.

In a preferred embodiment, Data messages (from here on just referred to as "messages") are lightweight objects that contain a source stamp, time stamp, and pointer to a resource blob (a smart pointer).

In a preferred embodiment, provision is made for three types of data to be referenced by the messages: raw data, stamped data, and Event Instances 24. Raw data consists of unnormalized source data of any type. It consists of a simple block of bytes and its size. Stamped Data is the same as Raw Data except that it also has an associated time-stamp of receipt and source identifier. Stamped Data is useful for the storage and replay of data from one or more external sources. It is critical for reconstruction of a Database from raw data. Raw Data is a purer form for use when the time of receipt is of no consequence and the (possibly costly) operation of ascertaining a time stamp is unnecessary.

In a preferred embodiment, it is expected that Source Modules will generate Raw Data and/or Stamped Data, that Normalizer Modules will process Stamped Data, Raw Data, and/or Event Instances 24, and that all other Module types will attend only to Event Instances 24—either discarding or passing along Raw Data and Stamped Data messages when encountered.

Figure 10:
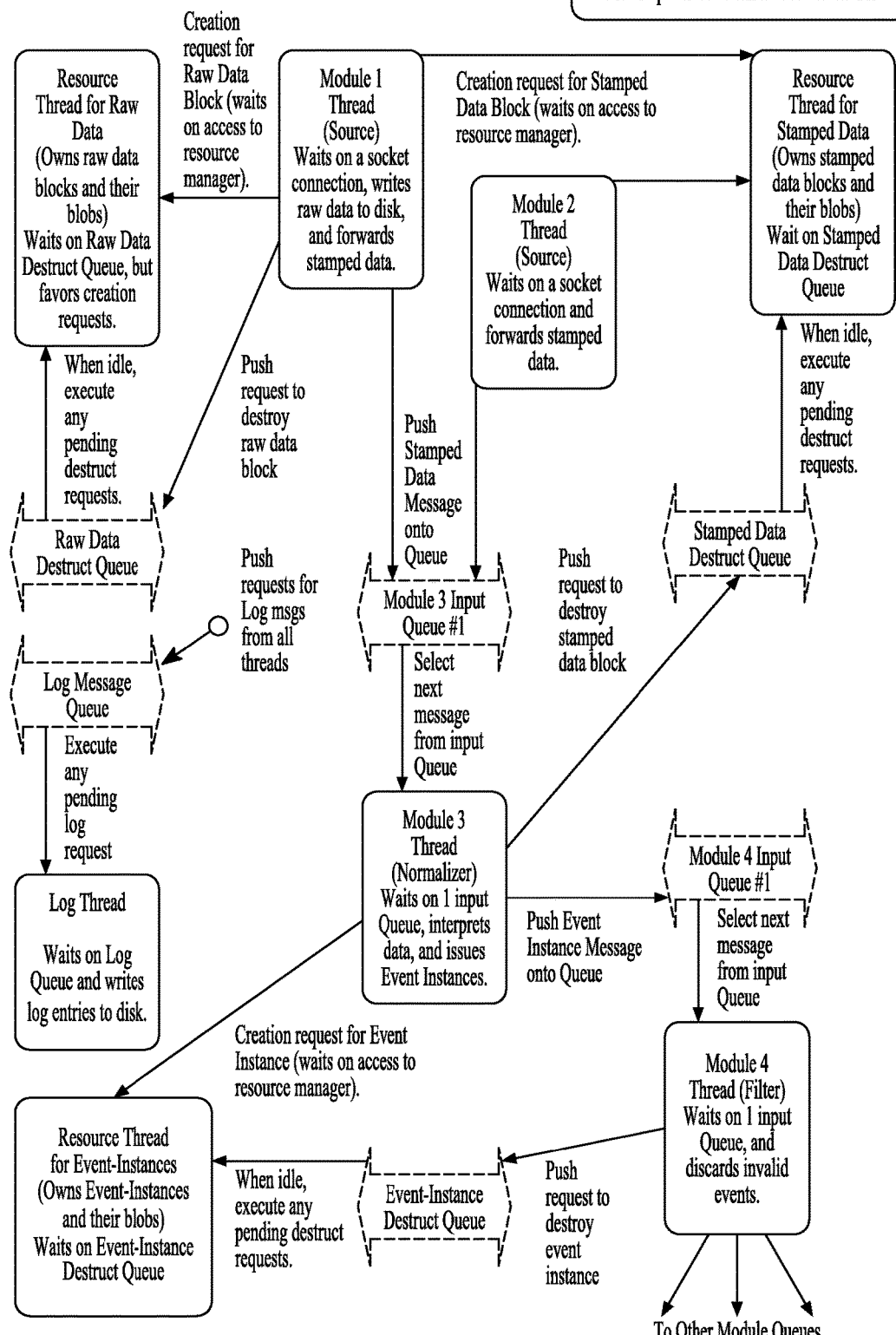
FIG. 10 illustrates a threading model for one embodiment of the Flow Manager.

Each of the three types of data is memory managed by its own resource manager in a separate thread and using a queue model (in the C++ sense, not to be confused with our Queue objects). Each message points to an object (herein termed a "blob") which serves as a smart pointer for one of these types. The message knows the type of its underlying. The blob associated with the underlying serves as a reference counter, is associated with the appropriate resource manager, and manages the copy-on-need approach employed by the Modules when modifications are necessary. The same blob may be pointed to by several messages, possibly moving along different paths in the Flow. When a Module wishes to modify the underlying object, the blob determines whether anyone else also points to it. If so, it spawns a new underlying and a new blob to which the Module may refer. FIG. 10 provides one embodiment of a sample threading model, illustrating both resource manager and Module threads.

Of the Module types mentioned earlier, special attention should be given to the Normalizer Module type. A Normalizer receives raw data from the source(s) (most likely Source Modules, but possibly other Modules as well) until it decides to either spawn one or more Event Instance(s) 24, mark it as raw data and pass it along for future interpretation, or discard it. The Normalizer uses the user defined Event Types 20 to determine when the incoming event and/or raw data may include an Event Instance 24. A block of incoming raw data might be associated with a single Event Instance 24 of a single Event Type 20, accumulated and eventually used to spawn Event Instances 24 of various Event Types 20, or discarded. For purposes of explanation, assume that any forwarded raw data is processed by other Normalizers, and focus only on Event Instances 24 from this point on.

Because it requires the ability to interpret source data, a Normalizer must have intimate knowledge both of the source data format and of the Event Types 20 that it may generate from it. In a preferred embodiment, a Normalizer is a user-specified Module that is specific to the data at hand and the specific Event Types 20 defined in the associated Database 14. In a preferred embodiment, the user may configure Normalizers programmatically, via a script, and/or via a GUI.

In a preferred embodiment, the Flow Manager 12 is comprised of numerous threads all working in harmony. Upon execution, the Flow Manager 12 begins in a master thread which controls all others and signals them if need be. It then spawns one thread for each Module as well as a resource manager thread for each of the three types of data (Event Instances 24, Raw Data, and Stamped Data), as well as a few other logging and management threads. The Module/Queue machinery is designed to be thread safe. Moreover, the Flow Manager 12 may actively monitor thread contention and any queue blockages. This may serve for diagnostic purposes as well as live management of the Flow(s) if necessary.

The queue model used (not to be confused with our Queue objects) involves a fire-and-forget approach to requests where possible. In the case of the Module threads, resource manager threads, and logging thread(s), messages are pushed onto an appropriate queue by the caller. The thread in question does nothing but process requests from that queue. Another thread pushing a request onto the queue will only block during the short time that someone else is doing the same or that the thread is reading the next request before processing it. This is a standard approach.

In keeping with this, requests to free a resource are pushed onto the queue of the appropriate resource manager thread and do not burden the caller. However, requests for new resources from a resource manager necessarily must wait for completion of that request—so these are performed by the calling thread itself, and block as necessary.

As mentioned, in a preferred embodiment each Module sits in its own thread. Its input Queues are protected by separate mutexes and use a condition variable. The Module loops on this condition variable and does the following in order when awakened: (i) It checks if the special input command-queue is empty. If not, it execute all commands in the queue. (ii) It selects one data message (if there is any) from amongst the input Queues using the custom "select" function. (iii) It processes that data message using the custom "execute" function. This may take a while. Any output requests are performed within this function. Note that such outputs are fire-and-forget because the Queues to which they push messages are governed by independent mutexes. They only block during the (brief) time that a Module is pushing a message onto them or that their own Module is selecting a message from them. While the latter is processing this message, the input Queues are open.

Module control messages may be sent via the command-queue, direct calls, signals, or other mechanisms.

In addition to the multi-threaded mode of operation in a preferred embodiment, some embodiments may include or solely implement a single-threaded mode. The single-threaded mode allows testing and diagnostics without worrying about threading issues. It also allows a deterministic case for simulation. Though the Module-Queue system should be subject to less non-determinism than simple mutex-based systems, exact reproducibility cannot be guaranteed in the multi-threaded embodiments. In fact, with high flow rates, non-determinism is highly likely. The single-threaded mode may be used for simulations where determinism is essential.

In a preferred embodiment, the single-threaded mode makes use of two special orderings of Flow Modules: front to back and back to front. These also are useful when starting, pausing, resuming, or terminating a flow. In what follows, a "source" Module is formally defined as a Module having no input Queues (active or inactive) and a "destination" module is formally defined as a Module having no outputs (to other Modules—we don't count outputs to disk or other places). These are topological notions, independent of whether various parts of the graph are active or paused at any given time. In graph terms, a source Module is a root and a destination Module is a leaf. We define the "distance" between Modules along a given path to be the number of Modules along the path (ex. 0 if from a Module to itself). An "active" path is one along which no Queues or Modules are paused. The orderings then are: a. Front to back: We assign each Module a "level" defined as the minimum distance from any source Module along any active path. Modules are ordered by level (low to high) and then by some persistent value (such as Module Instance Name—see below) within a level. b. Back to front: We assign each Module a "level" defined as the maximum distance to any destination Module along any active path. Modules are reverse-ordered by level (i.e. high to low) and then by some persistent value (such as Module Instance Name—see below) within a level.

Figure 11:
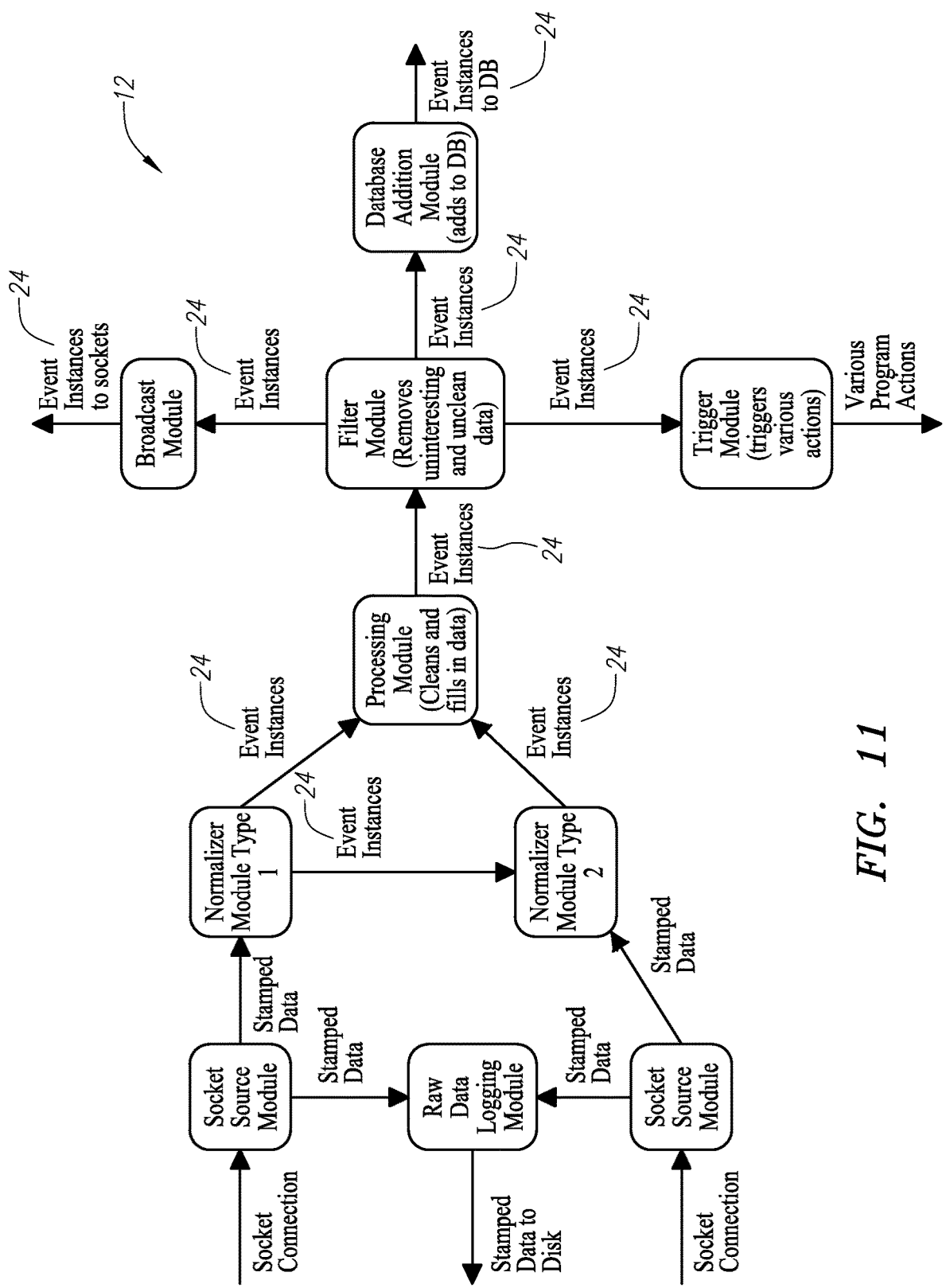
FIG. 11 illustrates one embodiment of a sample data flow as seen from the standpoint of Modules and Queues.

FIG. 11 illustrates the flow of data between the Flow Manager 12, Database 14 and various sources and destinations in one embodiment of the system 10. In a preferred embodiment, the Flow Manager 12 may run either stand-alone or as a server. As an example of how an embodiment of a Flow Manager 12 may operate, consider a Flow representing the likely progress of live raw data originating from one or more source streams (for example, socket connections). An appropriate source module 62 may receive each stream of raw data and simply accumulate it. The source module 62 would inject time stamp markers into the stream, write it to "raw data" files—managed through the Flow Manager 12 and VFS—and simultaneously fork it to one or more user-defined Normalizers.

Figure 7:
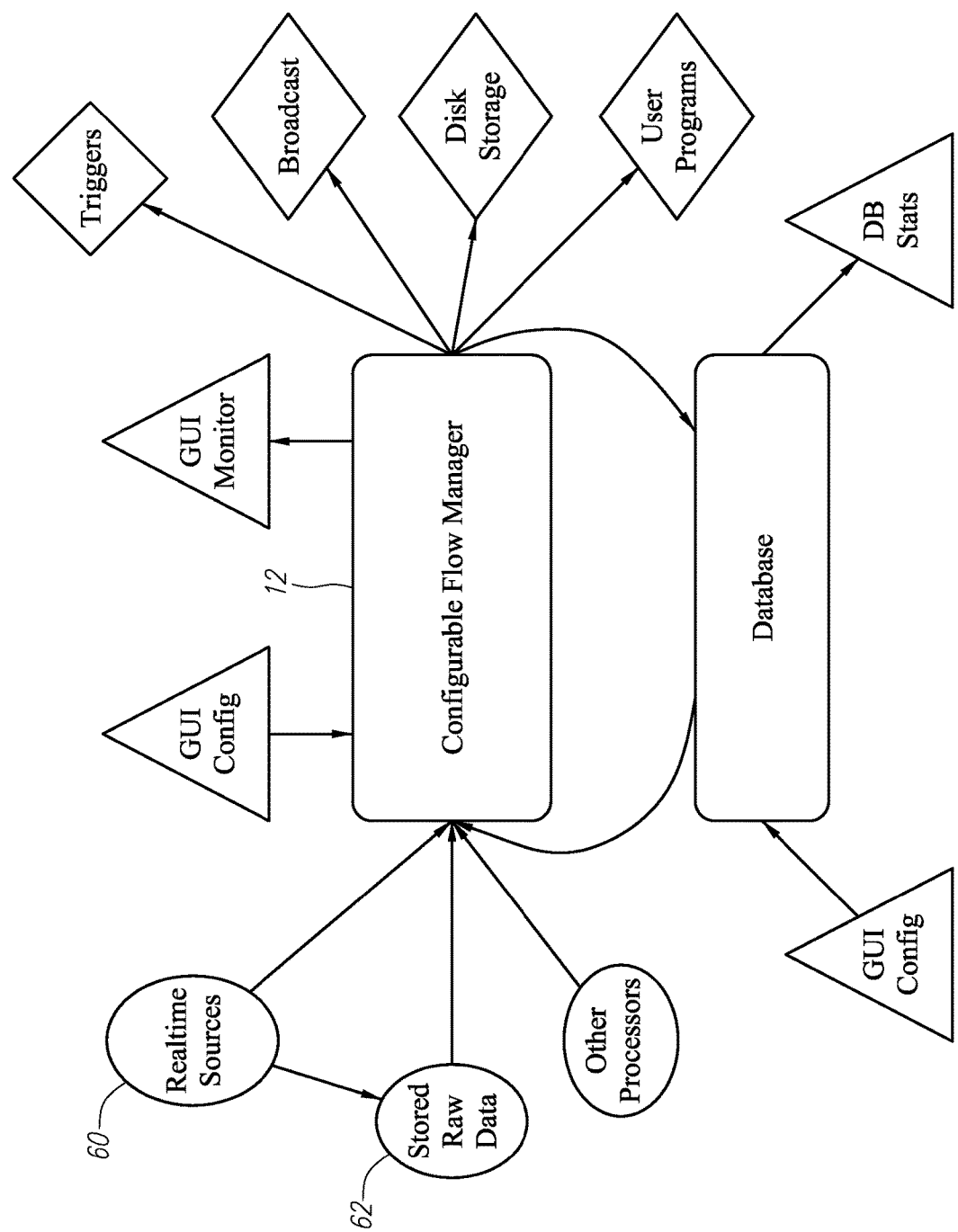
FIG. 7 illustrates the conceptual relationship between different components of one embodiment of a system including a Flow Manager, Database, and various sources and destinations of information.

As mentioned, one of the uses of a Flow is to read raw data into a Database. In that case, raw data would be obtained from one or more sources and normalized into Event Instances 24—which then would be added to the Database and/or broadcast, processed, or used in various ways. FIG. 7 illustrates the conceptual interplay between the various components of our system as a whole. Note that it does not represent a Flow, but rather the way that various programs and pieces of our system work with one another. FIG. 11 provides a more detailed example of the flow between Modules and Queues in an illustrative Flow designed to receive raw data, normalize and clean it, and make use of it in various ways.

In order to use the Flow Manager 12 in a preferred embodiment, certain components must be provided namely, 1.) Flow(s), and 2.) Modules (at minimum, Source and Normalizer Modules). Because most Modules (including Source Modules) may take a generic form, and in a preferred embodiment may be provided in a way common to most applications, focus is placed herein on custom Normalizers. Custom Normalizers are specific to the data at hand and the Event Types 20 defined for the associated Database 14. A Flow itself is not defined programmatically. In a preferred embodiment, a Flow consists of a choice of modules, connectivity, and parameters.

While executing a Flow, the Flow Manager 12 exports certain state information for each Queue, each Module, and overall. In a preferred embodiment, this data may be used by the client monitoring/management GUI or accessed by any other programs designed to do so. The Flow Manager 12 may or may not be open to external control as well, depending on whether it is run in stand-alone or server mode.

In a preferred embodiment, each Queue and each Module may have an additional set of state information and counters. This information may be exported for use by monitoring programs. For Queues, the set of information may be fixed. For Modules, a meaningful set of flags and counters based on type may be provided as part of the pre-included abstract base classes. In some embodiments, the user can add their own named flags, counters and statistics functions, via a set of member-function calls. In such an embodiment, the user defined flags, counters and statistics functions must be maintained by the user-defined virtual functions for the Module, and are exported along with all the rest.

As mentioned, in some embodiments, Flows may be defined via simple scripts. When describing a Flow with a script, a preferred embodiment of the script may describe the following: 1.) A set of Modules including a type and a name for each Module instance; 2.) A set of Queues including a name and the name of its associated output Module for each, and possibly an input index position of that Queue relative to its output Module; 3.) A set of connections (arrows) including the name of an input Module and a target Queue for each and possibly an output position index for that Queue relative to its input Module.

As mentioned, although in a preferred embodiment a number of simple Modules and Module categories may be provided, additional Modules may be defined by the user. In a preferred device that is not hard coded for a specific data source, the user must at the very least provide suitable Normalization Modules and likely will wish to customize other aspects of the Flow as well.

In a preferred embodiment, there are both programmatic and non-programmatic customizations to the Modules which may be made by the user. Programmatic customizations include specification of the internals of the Module and the virtual functions (notably "select" and "execute") which govern the behavior of the Module, while non-programmatic ones include the specification of user-defined statistics and state variables for use or export. However, even the programmatic aspects may be defined non-programmatically in the case of Normalizers.

Returning to Flow Modules, as mentioned earlier, in a preferred embodiment some of the Module types described above are included as abstract base classes. Normalizers require domain-specific knowledge of the raw data source. Most others require knowledge of the contents of an Event Instance 24. Aside from a few simple intrinsic Modules based on Event Wrapper 42 information, any filter, processor, accumulator, or switch would require knowledge of the internals of the user-defined Event Types 20.

As described above with respect to Event Types 20, in a preferred embodiment, Module classes are registered via a set of canonical functions to create instances, delete instances, and so on. However, unlike the case of Event Instances 24, here the form is constrained by the Module's membership in a specific class hierarchy. Most of the specialization occurs via virtual functions, and in a preferred embodiment, the canonical functions are generated automatically. Also, unlike with Event Instances 24, there will be relatively few Module Instances in any given Flow, and the need for an efficient factory is absent.

Registration of user-defined classes is accomplished similarly to that of Event Types. For API use, they may directly be registered via calls to the relevant functions. In other embodiments, calls may be made in any Registration Functions. The general use of DLLs and Registration Functions has already been described above.

For the special case of Normalizer Modules, a preferred embodiment may provide a simple scripting language and GUI for creating Normalizers. For many simple cases, a scripting language and GUI may be sufficient. In embodiments that provide a scripting language and GUI to define Normalizers, the scripting language and GUI may allow the user to specify mappings between input data and the members of Event Type classes, as well as some parsing options for the raw data stream. In such embodiments, it is recommended that Normalizers created with scripts and/or GUIs only be used with Event Type classes which also were defined via script or GUI.

In a preferred embodiment, every Module Type will have a unique name by which it may be identified and registered. Because it now is necessary, we shall now distinguish between Module Types and Module Instances (the meaning elsewhere is obvious from the context). Each Module Type must be registered by specifying certain canonical functions (basically to create and delete instances of it), a unique, persistent ID, and a unique persistent name. Module Instances are obtained from the Module Registry (part of the Flow Manager) on demand. Each Module has a unique Instance Name—not to be confused with the Module Type Name. Each Queue also has a unique Queue Name. The Module Instance Names and Queue Names may be used in the GUI or elsewhere to identify Module Instances and Queue Instances for inspection, connection, or management. In general, the Module Type names should be persistent and independent of any given Flow, whereas the Module Instance names and Queue Instance names must be unique within a Flow (and persistent if reuse is desired) but need not have any meaning outside that Flow.

Figure 9:
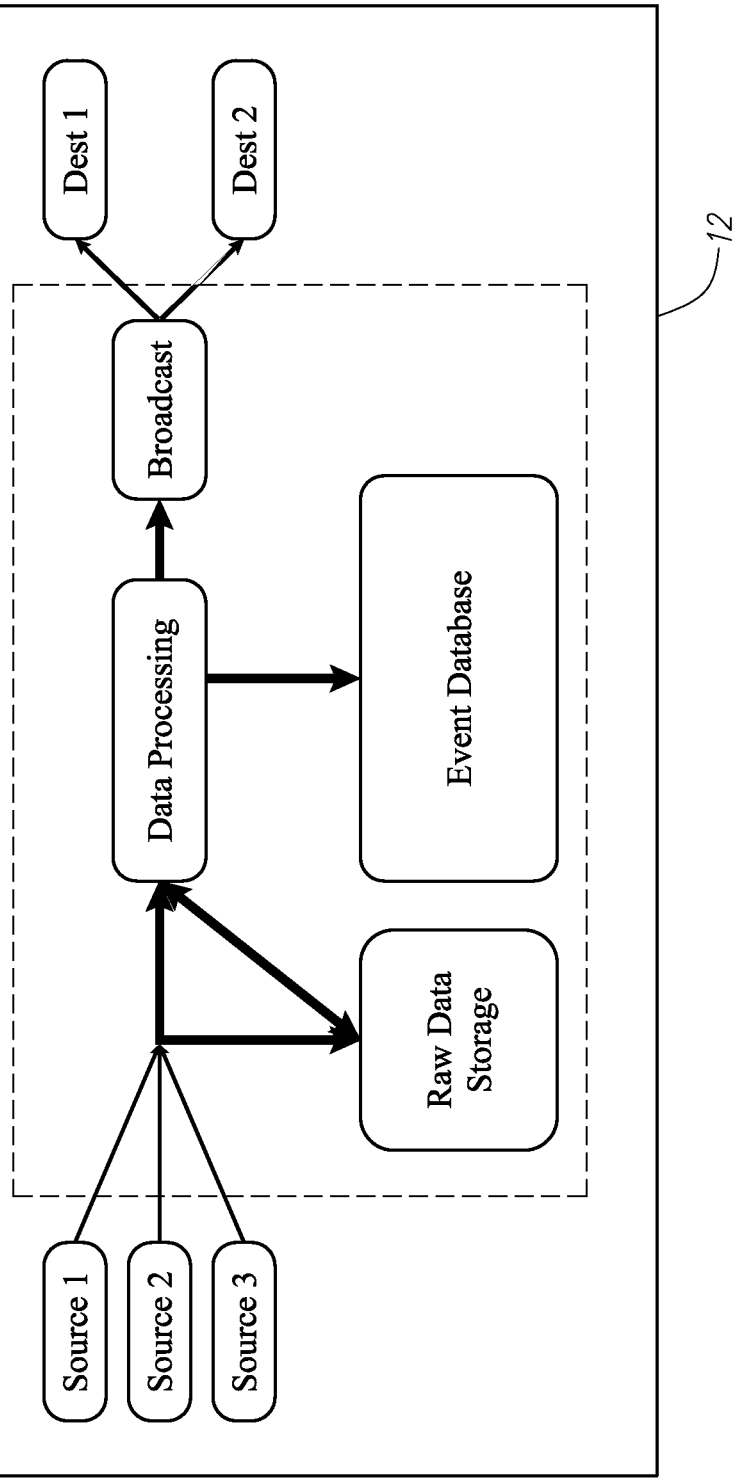
FIG. 9 illustrates one embodiment of a sample Data Flow from a high level system standpoint.

FIG. 9 provides an overview of one embodiment of a system including components of a data Flow, which is executed by running the Flow Manager 12. When the Flow Manager 12 is executed in a preferred embodiment, it loads the DLLs associated with any user-defined Modules Types and Event Types, loads a user-specified Flow-definition file, and optionally loads state information for the Queues and Modules from a previous session. Multiple Flows may be configured and run at the same time, subject to the obvious requirement that they do not contend for resources or conflict with one another. In a preferred embodiment, the Flow Manager 12 may be executed either from the command line or via the API.

In a preferred embodiment, a Client GUI is provided as a component of the overall system. However, in other embodiments, a user may write his own Client GUI to examine the information exported by the Flow Manager 12. In a preferred embodiment, the provided GUI may be configurable. As just one example, a user may configure components of the Client GUI such as what counters to use. In other embodiments, other components of the Client GUI may be configurable.

In addition to user-defined Modules, in some embodiments Modules may be selected from a predefined assortment of generic modules. Even if the Modules are selected from a predefined assortment, the user optionally may specify certain additional Flow-related features. In a preferred embodiment, certain internal features of modules (whether the module itself is user-defined or generically provided), such as counters, statistics, and certain other exportable state information, may be configured either programmatically or non-programmatically. In a preferred embodiment, a flow-monitoring GUI can be configured to display different statistics and state information for each Module and Queue in the graph. In a preferred embodiment, this may be done non-programmatically.

In a preferred embodiment, a Client GUI is provided to manipulate the Flow Manager 12 and corresponding Flows. In such an embodiment, a Client GUI can connect to a Flow Manager 12, which is running as a server. Through this interface, a user can monitor and manage the Flow. The following is a rough description of the appearance of one embodiment of such a Client GUI. Other embodiments of the Client GUI may be constructed with other appearances.

Figure 8:
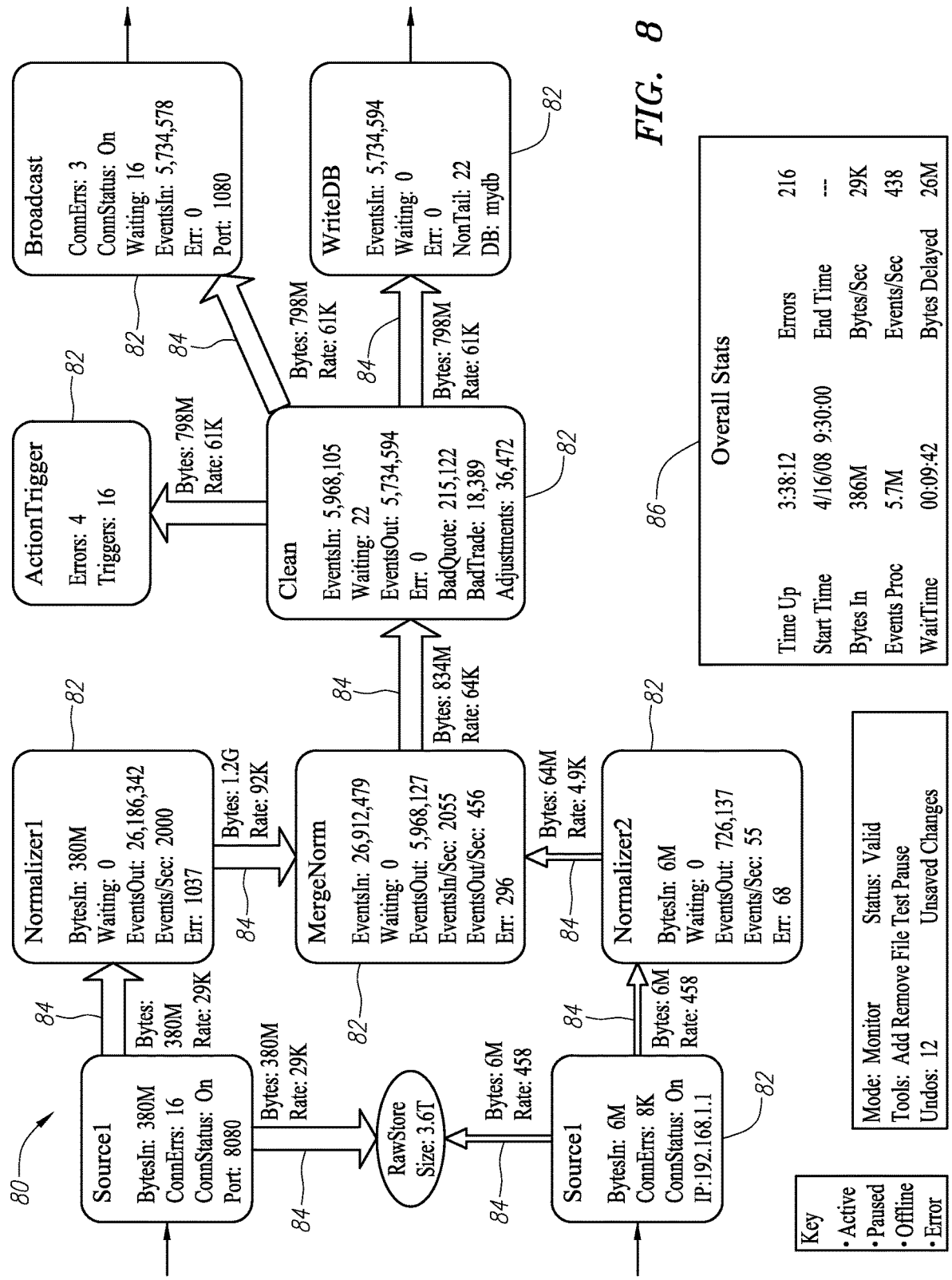
FIG. 8 illustrates one embodiment of a Graphical User Interface (GUI) overlay for a Flow Manager.

In at least one embodiment of a Client GUI for a Flow Manager 12, a flowchart-like large diagram of the system may be provided. FIG. 8 illustrates one embodiment of a diagram 80 to display and operate a Flow Manager 12. The diagram 80 may be scrollable if it is too big for the screen. The diagram may also be scalable, but with a minimum limit. Some embodiments of the diagram may include a tiny image of the entire Flow (similar to the "map" in a video game)—but without any info. Preferably, this may be on the lower right corner of the diagram.

In a preferred embodiment, the main diagram may consist of a series of boxes 82 and arrows 84. Within each box 82 and below each arrow 84, a set of statistical info for the associated Module or Queue may be provided. The information is updated dynamically and exported by the Module and Queue classes via the Flow Manager in which they reside.

In a preferred embodiment, the statistics displayed may be user-customizable. However, in most simple cases, the statistics consist of the number of events that pass through, the rate, and the number of events currently in queue.

Color may also be used to describe the state of the various components. In one embodiment, the color of the box or arrow may reflect state such as active, waiting, paused, etc. In yet other embodiments, icons or other visual methods may be used to reflect state. In addition, an activation bar with various icons for pausing/unpausing/locking/etc. may be provided. In a preferred embodiment, such an activation bar appears on the top right of the screen. In other embodiments, other methods of controlling the Flows may be provided. For example, clicking on the boxes 82 or arrows 84 may cycle through the various states. In yet another embodiment, the boxes 82 and arrows 84 may be dragged and dropped to control their state or connectivity.

In a preferred embodiment, clicking on one of the states in the activation bar sets the pointer to that mode. Subsequently clicking on an object such as a box 82 or arrow 84 then prepares to perform the relevant operation on that object. Various operations may be performed (non-committally) or undone. At each stage, any invalid regions are highlighted as are any unchanged but affected regions (ex. downstream).

Building or adding to the flow diagram will not be discussed. In a preferred embodiment, one of the mode icons is "addition mode." When the "additional mode" icon is pressed, a set of symbols may appear. In a preferred embodiment, these symbols may appear on the lower left of the diagram. The symbols that appear may include boxes for each known node type (either intrinsic or loaded from user DLL) as well as an arrow. These may be placed on the graph (as inactive) and connect via arrows (also inactive) to other nodes. They will remain marked as invalid until the configuration would be valid (i.e. inputs and outputs make sense, no loops, etc). When the user is satisfied with the changes (and they are approved as valid), then the user may press the "commit" button. Confirmation is required and the prior configuration stored. Commits may be undone (separately from the individual "undo" steps within a given set of changes). In a preferred embodiment, overall statistics 86 are provided. These, too, may be user customizable.

In a preferred embodiment, the Flow may be animated to represent the passage of data (and its volume) through the graph. Although an embodiment, of a Client GUI has been described, one skilled in the art will recognize that other forms of the Client GUI may be created without departing from the scope of the inventions described herein. For example, various different types of GUI elements may be used including buttons, sliders, radio buttons, drop down boxes or any other type of GUI element. Any number of GUI elements may be used and they may be arranged in any order.

Now that the System 10 has been described in detail, a few examples of how operations occur within the system may be helpful. The first example is how to move to an Event on Disk.

The following is exemplative pseudocode describing how to move to an event on disk and load it into memory given a virtual seek location POS (Position) (a location within the Twine File). Such a move could take place as the result of an iteration step (moving to the "next" or "prior" Event Instance 24 from a given one on disk) or a "find" operation. Note that the version below represents one embodiment of what is going on and should illustrate the salient features. One key point is that the preferred embodiment of the Database 14 only decodes and deserializes the actual Event Instance data at the point of need. The accompanying pre-computed data (Partition IDs, Sequence Value, and linkage) stored on disk allows the Database 14 to perform iteration and certain types of filtering without ever doing decoding or deserialization. In the example provide below, an extraneous option to decode and deserialize the data on the spot is included. While decoding and deserializing the data on the spot would rarely be done in practice, the relevant pseudocode to do so is included.

Step 1: If an in-memory Event Wrapper EMEM corresponding to POS exists in the Event-Cache: Then 1.) Raise priority (based on usage) of EMEM in the Cache; and 2.) Return EMEM.

Step 2: Locate the correct Twine subfile FILE (and real position RPOS in that file) corresponding to the virtual position POS.

Step 3: Seek to RPOS in FILE.

Step 4: Read the initial 4 bytes to get the size of the wrapper block WRAP.

Step 5: Read the wrapper block WRAP (which includes information about the size of the encoded data block).

Step 6: Read the encoded data block into memory ENC.

Step 7: If an on-disk Event Wrapper EDISK was not provided, spawn one from the Event Manager.

Step 8: Extract the Identity Info and linkage (as virtual seek positions) from WRAP into EDISK.

Step 9: Point EDISK to the encoded data block ENC.

Step 10: If asked to decode the data do the following (otherwise do this later if/when the data is decoded on demand): 1.) From the encoder ID in the Identity Info, locate the correct decoder; 2.) Determine the decoded data size from the decoder; 3.) Allocate a suitable block DEC to hold the decoded data; 4.) Decode the data into DEC; 5.) Free the block ENC holding the original encoded data; 6.) Create an Event Instance EV of the correct Event Type using the registered Event Instance creation function for that Event Type 20. 7.) Deserialize the decoded block DEC into EV using the registered deserialization function for that Event Type 20; 8.) Free the buffer DEC holding the decoded data; 9.) Spawn an in-memory Event Wrapper EMEM and copy the Identity Info and linkage into it; 10.) Point EMEM to EV, the Event Instance; 11.) Associate EMEM with POS, the virtual position of its counterpart on disk; 12.) Add EMEM to the front of the Event-Cache; 13.) If the Event-Cache is too large, drop the lowest priority in-memory Event Wrapper from the Event-Cache; 14.) Return EMEM.

Step 11: Otherwise return EDISK.

Another example of an operation the Database 14 performs is adding an event via tail addition. As used herein the "tail" subfile means the latest subfile in the Twine File. A much simpler method can be used for addition to a purely in-memory database. In a preferred embodiment, the Database 14 can also handle general insertions and removals (tail or otherwise). Insertions may not be performed as efficiently as tail additions. In a preferred embodiment, it is beneficial if the tail addition operation is fast. Accordingly, as explained above, a preferred embodiment of the Database 14 may not ensure atomicity by syncing the index to disk every time.

In a preferred embodiment, the individual write operations associated with an add event operation may not actually directly write to the database. Instead, all the write commands for a particular add event operation may be accumulated and then written to disk once all the write operations for an individual add event operation are accumulated. This may ensure that during a system crash or other type of failure, corruption does not occur. Write commands may be accumulated in an "atomic file." In yet other embodiments, other methods of providing atomicity may be used.

In one embodiment, an atomic file may be implemented as follows. First, the atomic file is cleared. Next, the atomic file is populated with "write" commands. If anything fails along the way, the file is cleared before returning. When the write commands have all been issued, the atomic file is marked as complete and then executed. When done, the atomic file is cleared. If something interrupts the execution of the atomic file, then on startup, the atomic file is detected and re-executed to ensure completion of the operation before anything else is attempted. This ensures that the addition as a whole (which involves many separate write operations to different files) is executed atomically in a loose sense. The individual write commands within the atomic file are designed in such a way that re-execution of a command is not a problem. For example, "write the following data block to location 67 of virtual subfile foo" is legitimate because repetition simply rewrites the same block (included in the atomic file) to the same location. On the other hand "write the following data block to the end of the latest file" is not legitimate because if repeated, it would append the same block twice. Mathematically, execution of the atomic file is idempotent (assuming no other operation is performed in between of course). In a preferred embodiment that uses an atomic file, any time something is "written" (the event wrapper, the event instance, the 4 byte size, the updated "next" pointers for existing events, and the subfile header), it is really adding a "write" command to the atomic file. Write operations, as used in the example below, may be to an atomic file, some other buffer, or directly to disk.

If the Database is sent an Event Instance 24 of a given Event Type 20 by the Flow Manager 12 or some other mechanism, the following pseudocode will add it to the tail of the on-disk Database 14 given the following inputs: Event Instance EV, choice of Encoder ID ENCID and the Event Type 20 of EV.

Step 1: Serialize and Encode the data as follows: 1.) Determine the serialization size of EV using the registered SerializationSize function for that Event Type 20; 2.) Allocate a block SER of that size; 3.) Serialize EV into the allocated block using the registered Serialization function for that Event Type 20; 4.) If ENCID is specified: 4a.) Lookup the appropriate encoder; 4b) Using this encoder, encode the serialized block into a variable-size buffer (reusable for efficiency), which gives us both an encoded block ENC and its size ESIZE; 4c.) Free the serialized block SER; 5.) Otherwise, set ESIZE to the serialized block size.

Step 2: Prepare the Twine File as follows: 1.) Verify that the Database 14 can write to the Twine File; 2.) Determine the size of the entire object (Identity+Linkage+ESIZE+4 bytes for TSIZE itself) on disk; 3.) If the current tail subfile has insufficient space: 3a.) Trim any wasted space (<TSIZE) at the end of the current tail subfile. 3b.) Allocate a new tail subfile via the VFS (on an available store). 4.) Determine CPOS, the virtual position to which the Database 14 will write everything (as a block of size TSIZE).

Step 3: Obtain an in-memory Event Wrapper EMEM as follows: 1.) Allocate an in-memory Event Wrapper EMEM via the memory manager; 2.) Attach EMEM to the Event instance EV; 3.) Attach EMEM to the Event Manager.

Step 4: Set the Identity Information for EMEM as follows: 1.) Obtain a unique Event Instance ID from the ID dispenser. 2.) Compute the Sequence Value T for EV using the registered Sequencer function for that Event Type 20. 3.) For each Iteration Method: 3a.) Compute the Partition ID for EV using the registered Iteration Method function for that Iteration Method ID and Event Type ID.

Step 5: Generate the Linkage (as follows): 1.) Locate the last Sequence Value in the Index; 2.) Verify that the last Sequence Value in the index is <=the Sequence Value T for EV; 3.) For each Iteration Method; 3a.) Lookup in the Index the last Event Instance in the Partition for EV computed for that Iteration Method; 3b.) If such an Event Instance exists; 3b1.) make note that its "Next" pointer (on disk) must be updated to point to CPOS; 3b2.) set the "Prior" pointer of EMEM to point to the virtual position on disk of the last Event in the Partition for EV under that Iteration Method.

Step 6: If the recovery flag file is empty, set it.

Step 7: Update the Twine File as follows: 1.) Allocate a block of memory BUF of size TSIZE (as computed above); 2.) Copy the total size TSIZE, the Event Type ID, Event Instance ID, Sequence Value, Partition IDs, Linkage, Encoder ID, and the encoded Event Instance size ESIZE from the in-memory Event Wrapper EMEM into BUF; 3.) If ENCID is specified, copy the encoded buffer ENC into the remaining space in BUF and free ENC; 4.) Otherwise, Copy the serialized block SER into the remaining space; 5.) free the serialized block SER; 6.) Write BUF to the next free byte in the tail subfile. 7.) For each Event Wrapper that must point to CPOS (from the earlier step): 7a.) Write CPOS to the position of the "Next" pointer (on-disk) for that Event Wrapper; 7b) If there is also a Cached version of the Event Wrapper, adjust the "Next" pointer in the Cached version too; 8.) Verify all changes.

Step 9: Update the Cache as follows: 1.) Have EMEM point to CPOS as its companion on disk; 2.) Add EMEM to the Cache; and 3.) If the Cache is too large, delete the Event Wrapper and associated Event Instance 24 at the rear.

Step 10: Update the Index as follows: 1.) Define SLICE to be the latest Slice value in the Index; 2.) If T>=the latest Slice in the Index, using the registered Slice Generator, add Slices until there are 10 past T; 3.) Redefine SLICE to be the first Slice >T; 4.) Update the Overall Bounds (as follows): 4a.) If there are no Event Instances; 4a1.) Mark this as the First Event Instance; 4a2.) Set the minimum Sequence Value to T; 5.) Mark this as the Last Event Instance; 6.) Set the maximum Sequence Value to T; and 7.) Augment the number of Event Instances in the database.

Step 11: For each Iteration Method Update the Index: 1.) If there is a new Partition, add a record for it; 1a.) Mark the Event Instance as the first in the Partition; 1b.) Set the minimum Sequence Value to T; 1c.) Augment the Partition count for the method; 1d.) Augment the Partition count overall; 2.) Mark the Event Instance as the latest in the Partition; 3.) Set the maximum Sequence Value in the Partition to T; 4.) Augment the number of Event Instances in the Partition; 5.) If the SLICE does not exist in the Partition: 5a.) Add a record for it; 5b.) Augment the record count for the method. 5c.) Augment the record count overall; and 6.) Point the record for SLICE in the Partition to CPOS.

Step 12: Update the Event Instance count in the subfile header.

Step 13: Execute the atomic file, actually committing the changes to the database. On success, clear the atomic file.

Step 14: Add 1 point to the tally toward syncing the Index to disk.

Step 15: If the Database 14 has reached the threshold for syncing: 1.) Set the tally to 0; 2.) Truncate the Index File; 3.) Write the entire Index to the Index File; and 4.) Truncate the flag file.

Another Database operation that is beneficial to include in embodiments of the Database 14 is a find (or seek) operation. In various different embodiments of the Database 14, many different mechanisms for intelligently scanning through Event Instances 24, locating Event Instances 24, and so on, may be provided. The following is a very basic but illustrative "find" function. Given a Sequence Value and a Partition ID under a specified Iteration Method, the find function locates the latest Event Instance 24 in that Partition prior to the Sequence Value 27. While the Index may be used, this is not a simple lookup. The specified Sequence Value 27 may not correspond to an Index Slice, so there could be Event Instances between it and the Slice. Also, the user optionally may specify a "starting" Event Instance. This allows the use of this function even when a simple iteration would suffice. The overhead of an Index Lookup is incurred only if required. The approach is roughly the same if searching for the latest Event Instance <=T or the earliest >T or ≥T. For simplicity, the distinction between "Event Instances" and "Event Wrappers" in the pseudocode is ignored and both are referred to as "events."

Given a Sequence Value Slice T, Partition ID P under Iteration Method M, and optional initial Event Wrapper E, a particular Event Instance may be iterated to. In the following pseudocode P(e,M) and T(e) denote the Partition ID under M and the Sequence Value of a given event e. Next(e,M) and Prior(e,M) denote the next and prior event in the same Partition under M. They are null (or the equivalent) if no such event exists. In a preferred embodiment, there is a (optional) parameter "maxsteps". If maxsteps is specified, the find algorithm will fail whenever the "maxsteps" number of iteration steps have been performed in a given search. An index lookup doesn't count as a step for this purpose.

Step 1: If E is specified and we are dealing with an in-memory DB, attempt a scan up to 3 steps to see if the result is near it. Note that any iteration steps while scanning count toward maxsteps. a.) Scanning is performed starting with E using the Scan method described below. Note that 3 is passed as the "maxsteps" parameter of the Scan algorithm. b.) If we find the result, return that.

Step 2: We determine a suitable starting event E. a.) Lookup in the index the latest event E with T(E')<T AND P(E',M)=P. b.) If E' doesn't exist, instead lookup in the index E' as the first Event in Partition P under M. c.) If neither way of defining E' works, return a null result (there are no events in P). d.) If on-disk DB, read the Wrapper for E' from disk.

Step 3: Scan starting with E' using the Scan method described below. Note that maxsteps passed to this algorithm is reduced by any from Step 1a.

One embodiment of a Scan algorithm for use by the Find algorithm above is provided below. The inputs to the Scan algorithm are: 1.) A starting event E (mandatory); 2.) Iteration Method M; 3.) Partition P under M; 4.) Target Sequence Value T; and 5.) Optional maximum allowed number of iteration steps maxsteps. If maxsteps is specified and we exceed it then we return a failure result.

Step 1: If T(E)<T a.) Scan forward using the ALL iteration method until we find an event E' in partition P under Iteration Method M. b.) If T(E)>=T, return failure result. c.) Scan forward starting with E' (up to maxsteps total, including any used so far) using Iteration Method M until we encounter the first Event E" with T(E")>=T. d.) If an E" is found, return the event prior to E" under Iteration Method M. e.) Otherwise, return the failure result.

Otherwise T(E)>=T and we do the following: a) Scan backward using the ALL iteration method until we find an event E' in partition P under Iteration Method M. b.) Scan backward starting with E' (up to maxsteps total, including any used so far) using Iteration Method M until we encounter an Event E" with T(E")<T. c.) If an E" is found, return it. d.) If no such E" is found, return the failure result.

Although the embodiments have been described with reference to preferred configurations and specific examples, it will readily be appreciated by those skilled in the art that many modifications and adaptations to the databases and methods of storing, retrieving, and processing data described herein are possible without departure from the spirit and scope of the embodiments as claimed hereinafter. Thus, it is to be clearly understood that this description is made only by way of example and not as a limitation on the scope of the embodiments as claimed below.

In particular, although the embodiments described above have generally referenced a flexible system 10 that allows users to define many aspects of the system 10, any number of these functions may be hardcoded. In addition, some of the logical associations that are used in a preferred embodiment, may not be required in alternative embodiments. As just one example, in some embodiments, other logical relationships between Iteration Methods 26 and Event Types 20 may be used. For example, an Iteration Method may be associated with a particular Event Type 20 such that it receives only Event Instances 24 of a particular Event Type 20; however, this is not a preferred embodiment.

What is claimed is:

1. A non-transitory computer-readable medium having computer-readable instructions stored thereon which, when executed by a computer, cause the computer to perform a method of processing data comprising the steps of:
   a. receiving data associated with event instances; and
   b. for each of a plurality of iteration methods, performing the following three steps in sequence:
      i. partitioning the incoming event instances into logical data partitions;
      ii. assigning an identifier to each event instance such that events classified in the same logical data partition receive the same identifier and a given event instance is always assigned the same identifier; and
      iii. inserting each event instance into a doubly-linked list associated with the identifier in an appropriate location.

2. The non-transitory computer-readable medium of claim 1, wherein new partitions in at least one iteration method may be dynamically added as needed during execution.

3. The non-transitory computer readable medium of claim 1, further comprising instructions that cause the computer to perform the step of associating a sequence value with each event instance wherein a given event instance is always assigned the same sequence value.

4. The non-transitory computer readable medium of claim 3, further comprising instructions that cause the computer to perform the step of dividing each doubly-linked list into a set of slices wherein each slice in the set of slices refers to an individual entry in the doubly-linked list.

5. The non-transitory computer readable medium of claim 4, wherein the slices occur at a regular sequence value interval.

6. The non-transitory computer readable medium of claim 4, wherein new slices occur after a designated number of event instances have been received.

7. The non-transitory computer readable medium of claim 4, further comprising instructions that cause the computer to perform the step of creating an index designed to store, for each doubly-linked list, sequence values associated with each slice and references to the individual entries.

8. The non-transitory computer readable medium of claim 7, wherein the index further includes for each doubly linked list: 1.) a reference to a first entry; 2.) a reference to a last entry; and 3) the number of linked entries.

9. The non-transitory computer readable medium of claim 1, further comprising instructions that cause the computer to perform the step of assigning a reference to the last event instance in each partition of each iteration method.

10. The non-transitory computer readable medium of claim 9, further comprising instructions that cause the computer to dynamically accommodate new data partitions from the iteration methods.

11. The non-transitory computer readable medium of claim 1, wherein the data constituting an event instance is user defined.

12. The non-transitory computer readable medium of claim 1, wherein the event instances are different sizes and have different data compositions.

13. The non-transitory computer readable medium of claim 1, further comprising instructions that cause the computer to perform the step of associating an index with a plurality of event instances.

14. The non-transitory computer readable medium of claim 13, further comprising a find algorithm that uses the index and the doubly linked lists assigned to partitions to locate an event instance subject to a specific set of conditions in a minimal number of steps.

15. The non-transitory computer readable medium of claim 1, further comprising instructions to cause the computer to store each event instance in non-volatile memory in only a single location.

16. The non-transitory computer readable medium of claim 1, wherein at least one iteration method of the plurality of iteration methods has a single logical data partition that is associated with a doubly linked list over all the event instances.

17. The non-transitory computer readable medium of claim 1, wherein at least one iteration method of the plurality of iteration methods is user defined.

18. The non-transitory computer readable medium of claim 17, wherein the number of iteration methods is user defined.

19. The non-transitory computer readable medium of claim 1, wherein the data constituting an event instance is parsed from a serial data stream.

20. A database comprising:
- a plurality of data structures stored in non-volatile memory, wherein each data structure contains data representing an event instance;
- a plurality of event wrappers stored in non-volatile memory, wherein each event wrapper is associated with a single event instance; and wherein each event wrapper comprises a sequence value and a plurality of partition ID's wherein each partition ID is assigned by an iteration method and represents a logical data partition of the iteration method that assigned the partition ID and wherein an event wrapper contains, for each iteration method, a reference to the previous and next event wrapper with the same partition ID.

21. The database of claim 20, wherein each event wrapper further comprises the information necessary to decode and deserialize the associated event instance.

22. The database of claim 21, wherein the information necessary to decode and deserialize the associated event instance includes an event type ID and an encoder ID.

23. The database of claim 20, wherein the data representing each event instance is only stored once in the non-volatile memory.

24. The database of claim 20, wherein each event wrapper is stored only once in the non-volatile memory.

25. The database of claim 20, wherein each event instance is a member of one and only one logical data partition for each iteration method.

26. The database of claim 20, wherein the sequence value gives a sequential order to any single event instance.

27. A non-transitory computer-readable medium having computer-readable instructions stored thereon which, when executed by a computer, cause the computer to perform a method of processing data comprising the steps of:
   a. receiving data associated with event instances; and
   b. for each of a plurality of iteration methods performing the following three steps in sequence:
      i. partitioning the incoming event instances into logical data partitions such that each event instance is assigned to one, and only one, logical data partition for each given iteration method;
      ii. assigning an identifier to each event instance such that events classified in the same logical data partition for a given iteration method receive the same identifier and a given event instance is always assigned the same identifier for a given iteration method; and
      iii. inserting each event instance into a doubly-linked list associated with the identifier in an appropriate location, each event instance thereby being inserted into a doubly-linked list associated with one logical data partition for each iteration method.

* * * * *